United States Patent
Mizuno

(10) Patent No.: US 11,194,383 B2
(45) Date of Patent: Dec. 7, 2021

(54) DISPLAY DEVICE AND METHOD FOR CONTROLLING SAME

(71) Applicant: CASIO COMPUTER CO., LTD., Tokyo (JP)

(72) Inventor: Kimiyasu Mizuno, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 500 days.

(21) Appl. No.: 16/065,129

(22) PCT Filed: Sep. 13, 2016

(86) PCT No.: PCT/JP2016/077608
§ 371 (c)(1),
(2) Date: Jun. 21, 2018

(87) PCT Pub. No.: WO2017/110174

PCT Pub. Date: Jun. 29, 2017

(65) Prior Publication Data

US 2019/0004595 A1 Jan. 3, 2019

(30) Foreign Application Priority Data

Dec. 22, 2015 (JP) .............................. JP2015-249286

(51) Int. Cl.
*G06F 1/3293* (2019.01)
*G06F 1/3234* (2019.01)
(Continued)

(52) U.S. Cl.
CPC .............. *G06F 1/3293* (2013.01); *G06F 1/32* (2013.01); *G06F 1/3234* (2013.01);
(Continued)

(58) Field of Classification Search
CPC . G06F 1/3296; G06F 1/32; G06F 3/14; G06F 3/1446; G06F 1/3265;
(Continued)

(56) References Cited

U.S. PATENT DOCUMENTS 5,896,575 A * 4/1999 Higginbotham .......... G06F 1/16
455/557
6,603,469 B1 * 8/2003 Gettemy ............... G06F 1/3203
345/102

(Continued)

FOREIGN PATENT DOCUMENTS

JP 2003099153 A 4/2003
JP 2006139145 A 6/2006
(Continued)

OTHER PUBLICATIONS

European Office Action dated Jun. 8, 2020 issued in counterpart European Application No. 16878071.6.
(Continued)

*Primary Examiner* — Julie Anne Watko
(74) *Attorney, Agent, or Firm* — Holtz, Holtz & Volek PC

(57) ABSTRACT

A display device and a method for controlling same are provided which are capable of suppressing power consumption of an electronic apparatus while supplying a user with various types of information in various display formats. The display device has a first display block including a processor with relatively high processing power and a display section with high display performance and a second display block including a processor with relatively low processing power and a display section with low display performance. The processors mutually collaborate and are controlled to properly use the first display block and the second display block in accordance with an operation mode.

12 Claims, 9 Drawing Sheets

(51) Int. Cl.

| | |
|---|---|
| *G06F 1/324* | (2019.01) |
| *G09G 3/20* | (2006.01) |
| *G09G 3/34* | (2006.01) |
| *G06F 1/32* | (2019.01) |
| *G06F 1/3212* | (2019.01) |
| *G09G 3/36* | (2006.01) |
| *G06F 3/14* | (2006.01) |
| *G06F 1/3296* | (2019.01) |
| *H04N 5/66* | (2006.01) |
| *G06F 1/3218* | (2019.01) |

(52) U.S. Cl.
CPC .......... *G06F 1/3265* (2013.01); *G06F 1/3296* (2013.01); *G06F 3/14* (2013.01); *G06F 3/1446* (2013.01); *G09G 3/20* (2013.01); *G09G 3/34* (2013.01); *G09G 3/3406* (2013.01); *G09G 3/36* (2013.01); *G06F 1/324* (2013.01); *G09G 2300/023* (2013.01); *G09G 2330/021* (2013.01); *G09G 2330/022* (2013.01); *G09G 2330/023* (2013.01); *G09G 2330/027* (2013.01); *G09G 2340/0435* (2013.01); *H04N 5/66* (2013.01)

(58) Field of Classification Search
CPC ............ G06F 1/3293; G06F 1/324; G06F 2320/0257; G06F 2330/022; G09G 3/18; G09G 3/20; G09G 3/34; G09G 3/3406; G09G 3/36; G09G 5/00; G09G 2300/023; G09G 2320/0242; G09G 2330/021; G09G 2330/023; G09G 2330/027; G09G 2340/0435; G09G 2330/022; H04N 5/66
See application file for complete search history.

(56) References Cited

U.S. PATENT DOCUMENTS

| | | |
|---|---|---|
| 7,406,667 B2 | 7/2008 | Numano et al. |
| 7,823,090 B2 | 10/2010 | Numano et al. |
| 8,462,144 B2 | 6/2013 | Jepsen |
| 10,025,150 B2 | 7/2018 | Igarashi |
| 2002/0158999 A1* | 10/2002 | Shima ................. H04M 1/0245 349/58 |
| 2002/0196387 A1* | 12/2002 | Kimura ............. G02F 1/133603 349/61 |
| 2003/0061410 A1 | 3/2003 | Numano et al. |
| 2005/0024339 A1* | 2/2005 | Yamazaki ........... H01L 27/3234 345/169 |
| 2008/0007486 A1 | 1/2008 | Fujinawa et al. |
| 2009/0027323 A1 | 1/2009 | Choi |
| 2009/0031233 A1 | 1/2009 | Mumano et al. |
| 2009/0231662 A1* | 9/2009 | Sorensson ............ G06F 1/1684 359/273 |
| 2009/0298546 A1* | 12/2009 | Kim ..................... G06F 1/1686 455/566 |
| 2010/0020054 A1 | 1/2010 | Jepsen |
| 2013/0009921 A1 | 1/2013 | Kamano et al. |
| 2013/0113682 A1* | 5/2013 | Heizer ................. G06F 1/1647 345/1.1 |
| 2013/0135177 A1 | 5/2013 | Tsuruoka |
| 2013/0271378 A1* | 10/2013 | Hulford ................. G09G 3/20 345/168 |
| 2014/0049449 A1* | 2/2014 | Park ........................ G09G 3/20 345/1.3 |
| 2015/0042539 A1* | 2/2015 | Avrahami ............. G06F 3/1446 345/1.3 |
| 2015/0179113 A1 | 6/2015 | Hunt et al. |
| 2015/0185518 A1 | 7/2015 | Igarashi |
| 2015/0346987 A1* | 12/2015 | Ren .......................... G06F 1/32 345/589 |
| 2016/0086568 A1* | 3/2016 | Imamura ................ G06F 3/002 345/643 |
| 2016/0224302 A1* | 8/2016 | Imana ................... G06F 1/3212 |
| 2020/0124917 A1* | 4/2020 | Igarashi ............ G02F 1/134327 |

FOREIGN PATENT DOCUMENTS

| | | |
|---|---|---|
| JP | 2006208536 A | 8/2006 |
| JP | 2006243329 A | 9/2006 |
| JP | 2007121368 A | 5/2007 |
| JP | 2007127724 A | 5/2007 |
| JP | 2009053586 A | 3/2009 |
| JP | 2010164781 A | 7/2010 |
| JP | 2013015779 A | 1/2013 |
| JP | 2013114277 A | 6/2013 |
| WO | 2010137670 A1 | 12/2010 |

OTHER PUBLICATIONS

Japanese Office Action (and English language translation thereof) dated May 15, 2018 issued in counterpart Japanese Application No. 2017-098597.
Extended European Search Report (EESR) dated May 17, 2019 issued in European Application No. 16878071.6.
International Search Report (ISR) dated Dec. 20, 2016 issued in International Application No. PCT/JP2016/077608.
Written Opinion dated Dec. 20, 2016 issued in International Application No. PCT/JP2016/077608.

* cited by examiner

FIG. 10
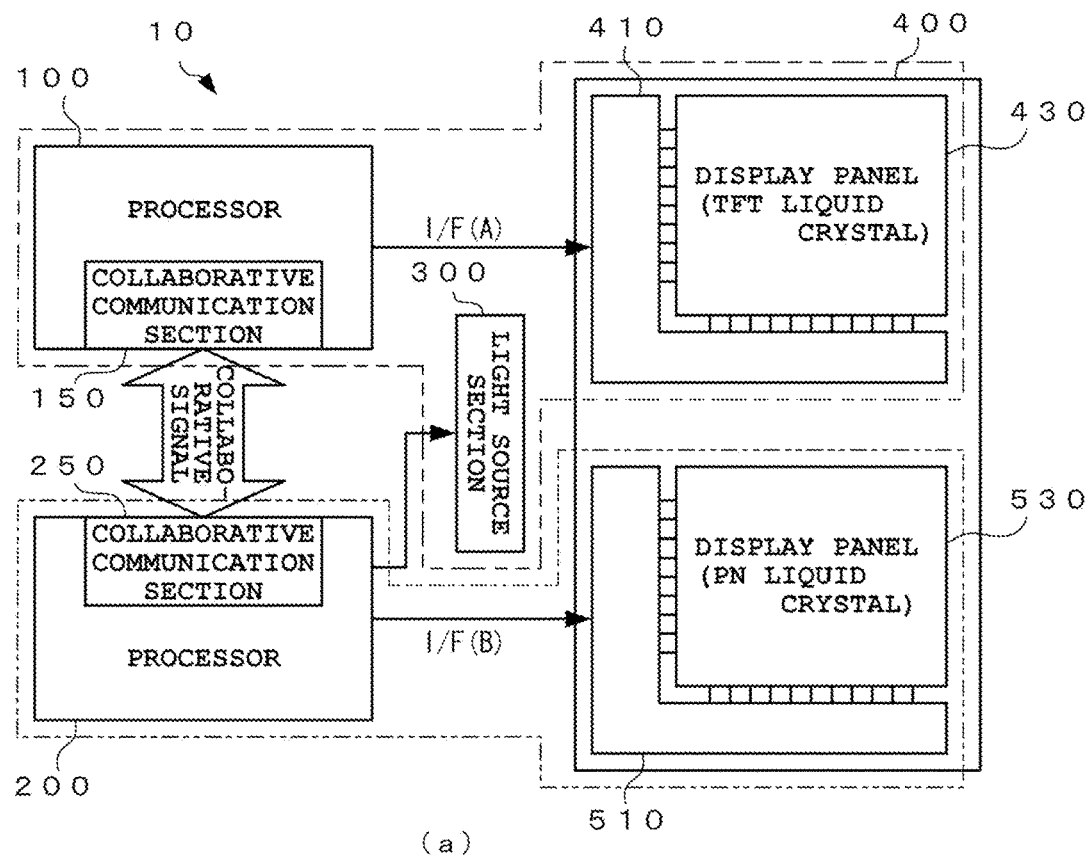
(a)
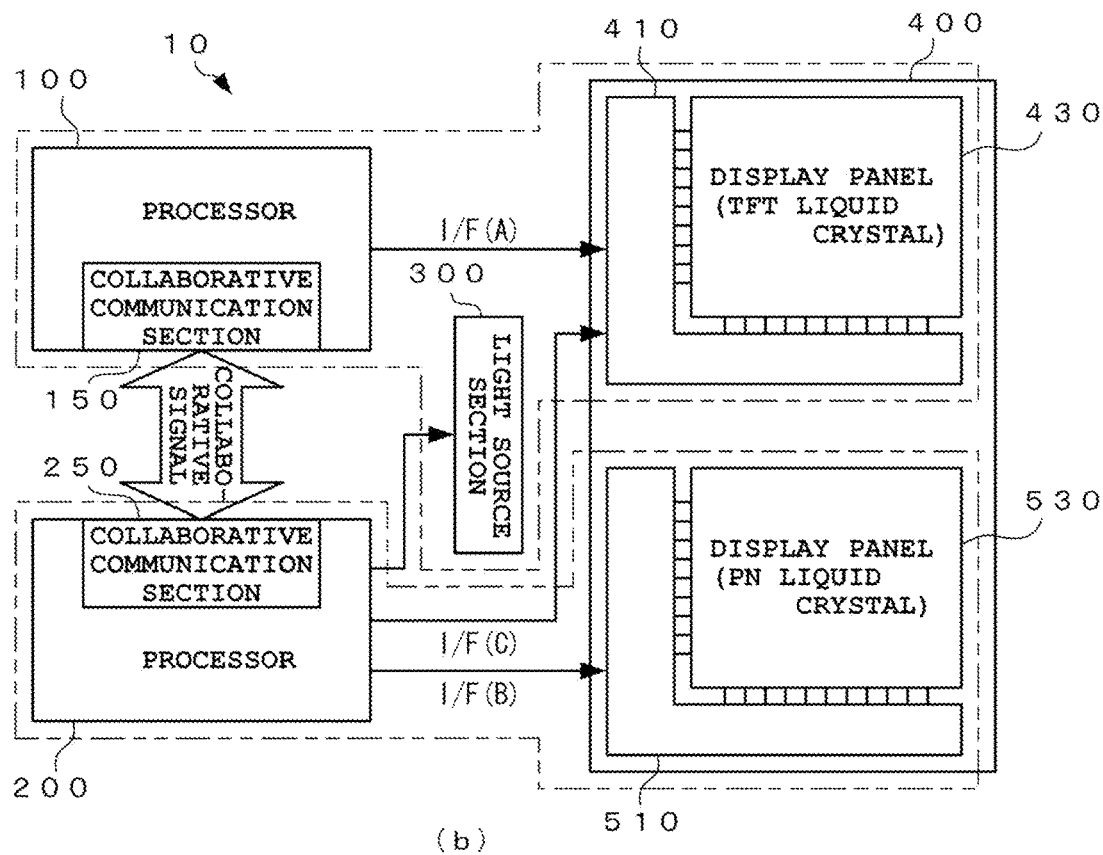
(b)

DISPLAY DEVICE AND METHOD FOR CONTROLLING SAME

CROSS-REFERENCE TO RELATED APPLICATIONS

The present application is U.S. National Phase application of International Application No. PCT/JP2016/077608, filed Sep. 13, 2016, claiming priority of and based on Japanese Patent Application No. 2015-249286, filed Dec. 22, 2015, the entire contents of both of which are incorporated herein by reference.

TECHNICAL FIELD

The present invention relates to a technology for display devices that are applied in electronic apparatuses having a function for displaying various types of information.

BACKGROUND ART

In recent years, portable information communication apparatuses which are worn on human bodies and collect various data at the time of exercise or in daily life, such as so-called smart devices, smartphones (high-functionality cellular phones), and tablet terminals, are significantly prevalent. In various widely distributed electronic apparatuses including these apparatuses, display devices for providing various information to users are mounted.

Here, in order to improve viewability for the users or to meet demands for advanced display, high-definition, fast (smooth), and color display has been required for the display information of the display devices. However, in general, color display requires increased power consumption, by which the driving time of a wearable or portable electronic apparatus such as those described above may be shorten and, in the case of a stationary electronic apparatus, its power-saving performance may be degraded. Also, in the case of an electronic apparatus capable of such color display, its power consumption may be relatively increased even when simple information whose information amount is relatively small and which is used for clock display, incoming call display, and the like is displayed by monochrome display or mono-color display.

Therefore, various methods have been conceived which can actualize various types of display functions for high-definition, fast, and color display and easy information display while reducing power consumption. For example, Patent Document 1 describes a structure of an image forming apparatus such as a multifunction peripheral, in which an operation panel section is equipped with a small-sized first display panel with low power consumption and a large-sized second display panel with high power consumption. In this structure, in a normal operation mode, the second display is off and only the first panel is on for display. In a detailed display mode thereof, the first panel is off and only the second display is on for detailed confirmation of setting contents or change operations therefor. As a result, power-saving is achieved without deterioration in the information display function of the operation panel section and the operability.

Also, Patent Document 2 describes a structure of a liquid crystal display device, in which a transmissive display area and a reflective display area are disposed with each of the pixels arranged in matrix form and individual sub-pixels are provided to each display area. In this structure, display modes are switched based on the status of external light In the transmissive mode thereof, transmissive display is performed by sub-pixels in the transmissive display area of each pixel, whereby vivid color display is achieved. In the reflective mode, reflective display is performed by a sub-pixel in the reflective display area of each pixel, whereby bright monochrome display or mono-color display are performed and power consumption is reduced.

PRIOR ART DOCUMENTS

Patent Documents

Patent Document 1: JP 2010-164781
Patent Document 2: JP 2007-121368

SUMMARY OF INVENTION

Problem to be Solved by the Invention

However, in the configuration described in Patent Document 1, a single CPU is required to constantly monitor the display mode of the operation panel section and judge the switching thereof Accordingly, there is a problem in that the processing load on the CPU is increased, whereby its power consumption cannot be sufficiently reduced.

Also, in the configuration described in Patent Document 2, the sub-pixel for transmissive display and the sub-pixels for reflective display are formed in each pixel, and are required to be controlled individually in accordance with the display mode. Therefore, there is a problem in that display control is complicated and whereby the processing load on the CPU is increased.

The present invention has been conceived in light of the above-described problems. An object of the present invention is to provide a display device and a control method capable of reducing the power consumption of an electronic apparatus while providing the user with various types of information in various display formats.

Means for Solving the Problem

In accordance with one aspect of the present invention related to the first embodiment, there is provided a display device having a second display panel and a first display panel laminated thereon from a visual field side, and comprising a control section and a light source section, characterized in that the control section controls switching of a first operation mode where first image data is displayed on the first display panel, the light source section is turned on, and the second display panel enters a transmissive state so that the first image data is visually recognized, a second operation mode where second image data is displayed on the second display panel, and the first display panel and the light source section enter a halt state so that the second image data is visually recognized in a reflective manner, a third operation mode where the second image data is displayed on the second display panel, the light source section is turned on, and the first display panel enters the halt state so that the second image data is visually recognized, and a fourth operation mode where third image data acquired by the first image data and the second image data being combined is displayed on the first display panel, the light source section is turned on, and the second display panel enters the transmissive state so that the third image data is visually recognized, and characterized in that the control section does not perform simultaneous display of the first display panel and the second display panel.

Effect of the Invention

According to the present invention, power consumption of an electronic apparatus can be suppressed while supplying a user with various types of information in various display formats.

BRIEF DESCRIPTION OF DRAWINGS

FIG. 10 is a schematic block diagram showing modification examples of the first and second embodiments.

DESCRIPTION OF EMBODIMENTS

Hereafter, embodiments of a display device, a method for controlling same, and a control program according to the present invention will be described in detail.

First Embodiment

Display Device

Figure 1:
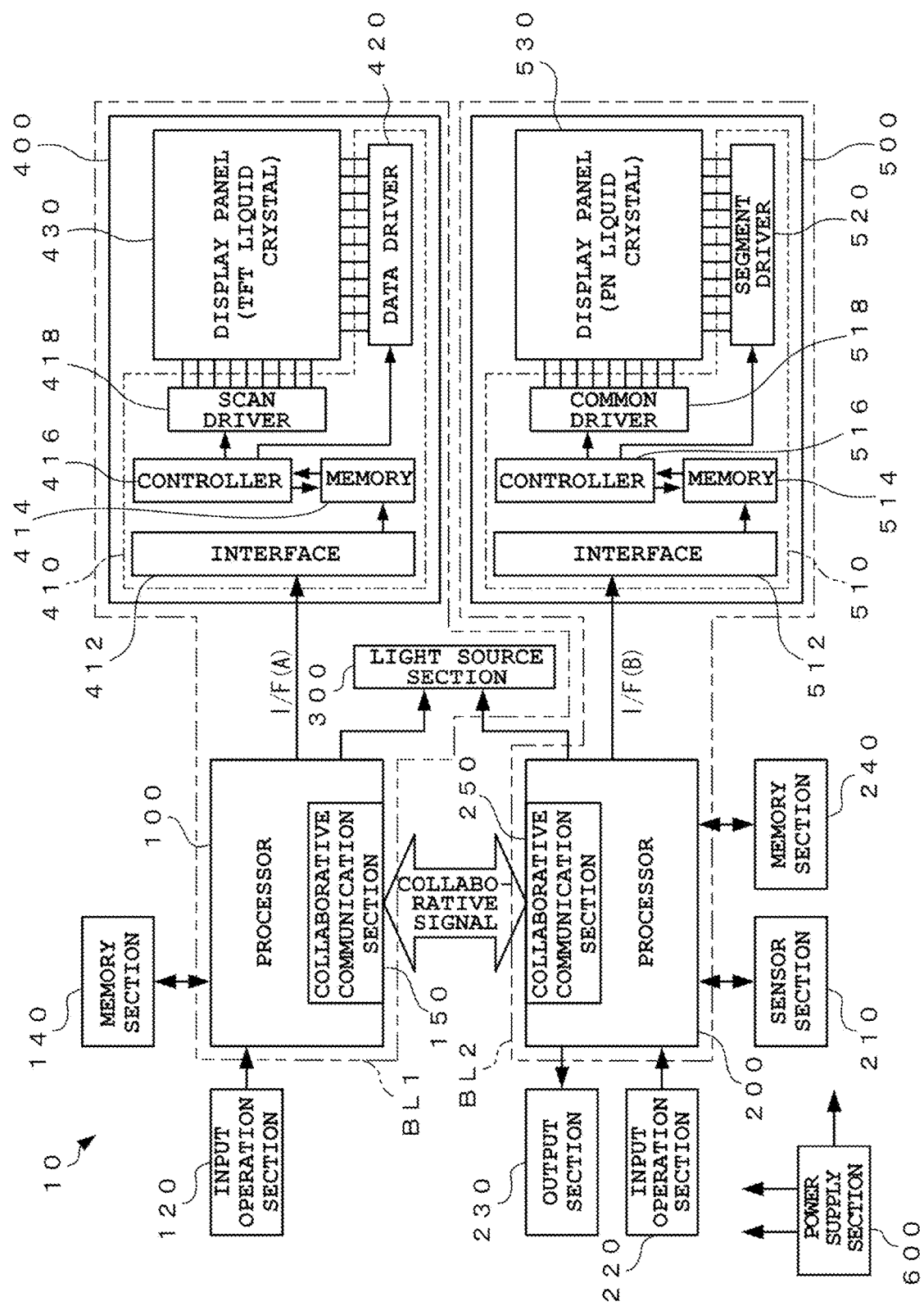
FIG. 1 is a schematic block diagram showing a first embodiment of a display device according to the present invention.

FIG. 1 is a schematic block diagram showing a first embodiment of a display device according to the present invention. In this diagram, a structural example of the display device according to the present invention when it is applied in a wearable or portable electronic apparatus is shown. This display device according to the present invention can be applied in various electronic apparatuses having display panels, such as a wristwatch or wristband type smartwatch, a smartphone, a mobile phone, a portable apparatus for outdoor use (for example, a GPS logger), and an in-vehicle apparatus (for example, a navigation system). Specifically, the display device 10 according to the present embodiment mainly includes, for example, a first display block BL1 and a second display block BL2, as shown in FIG. 1. The first display block BL1 includes a processor 100 (which is operable as a first processor, an input operation detection section, and a remaining battery level detection section), a light source section 300, and a display section 400. The second display block BL2 includes a processor 200 (which is operable as a second processor, an input operation detection section, and a remaining battery level detection section), and a display section 500. The processor 100 of the first display block BL1 is connected with at least an input operation section 120 and a memory section 140, and the processor 200 of the second display block BL2 is connected with at least a sensor section 210, an input operation section 220, an output section 230, and a memory section 240.

The processor 100, which is an arithmetic circuit such as a CPU (Central Processing Unit) or a MPU (Microprocessor), executes a predetermined control program and a predetermined algorithm program under the control of an OS (Operating System), and thereby controls a processing operation in accordance with an input operation by the input operation section 120, the display states of various information in the display section 400 described later, and the like.

As the OS, for example, "ANDROID" (registered trademark) of Google Inc. in the U.S. can be adopted. The processor 100 is connected to the display section 400 via an interface circuit 412 complying with a standard for an interface (referred to as "I/F (A)" in the drawing) where a data transfer rate is relatively high, such as serial interfaces including MIPI (Mobile Industry Processor Interface) and various types of parallel interfaces. By a predetermined signal including image data (first image data) generated by the processor 100 being transmitted to the display section 400, a predetermined image is displayed on the display section 400. Also, the processor 100 includes a collaborative communication section 150. By transmitting or receiving a predetermined collaborative signal to or from the processor 200 described later, the processor 100 collaborates and synchronizes with the processor 200 so as to control at least the display states of the display sections 400 and 500. The collaborative communication section 150 includes a shared memory, and has a connection port complying with a serial communication standard, such as a UART (Universal Asynchronous Receiver Transmitter) or an I2C (Inter-Integrated Circuit). By being connected to a collaborative communication section 250 provided in the processor 200, the collaborative communication section 150 transmits or receives at least a predetermined collaborative signal or an interrupt signal for controlling the display states of the display sections 400 and 500.

Here, as the processor 100 for the present embodiment, an arithmetic circuit whose processing power is relatively high to control at least high-performance display for the display section 400 is adopted. The high-performance display herein is for example, the display of high definition color images, color graphics, smooth moving images, and animation, or the display of images having a large data volume which are highly expressive by, for example, a visual effect such as a transition effect, and images that are frequently updated or varied (by movements therein) in screen display (highly functional images; first images). In general, an arithmetic circuit to be adopted as this type of processor 100 consumes a large amount of power by executing various processing operations at a high operation frequency (first operation frequency). In other words, an arithmetic circuit whose processing power is relatively high (high performance) and which consumes a large amount of power (high power) is required to be adopted as the processor 100. In the present embodiment, an arithmetic circuit that operates at a relatively high operation frequency of about several hundreds of MHz to 1 GHz is adopted so as to draw images on the later-described display panel 430 of the display section 400 at a relatively high frame rate of, for example, 30 fps or 60fps. Here, the control program and the algorithm program to be executed by the processor 100 may be stored in the memory section 140 or may be embedded in the processor 100 in advance.

The input operation section 120 is input means such as a touch panel arranged on the visual field side of the display panel 530 provided in the display section 500 described later. This input operation section 120 outputs various operation signals based on the user's input operations to the processor 100, whereby items and information to be displayed on the display panel 430 are selected and set in the processor 100. Note that, although details will be described later, the display panel 530 of the display section 500 has a transmissive panel structure and is arranged such that it overlaps with the visual field side of the display panel 430 of the display section 400 in a planar view.

The memory section 140 stores data that is used when the predetermined control program or the predetermined algorithm program is executed by the processor 100, data generated thereby, data to be displayed on the display section 400, and the like. Note that a configuration may be adopted in which the predetermined control program and the predetermined algorithm program to be executed by the processor 100 are stored in the memory section 140. Also, the memory section 140 may be partially or entirely in a form of a removable storage medium such as a memory card, and may be structured to be removable from the display device 10.

The processor 200 is an arithmetic circuit such as a CPU and a MPU, as in the case of the processor 100. By executing a predetermined control program and a predetermined algorithm program, the processor 200 controls sensing operations by the sensor section 210, processing operations in response to input operations by the input operation section 220, the provision of various types of information by the output section 230, the display states of various types of information on the display section 500 described later, and the like. Unlike the processor 100, the processor 200 is operated not by an OS such as ANDROID (registered trademark) but by a small program (a program which is simple and does not impose a large burden) such as BIOS (Basic Input Output System). In this specification, this program is exemplarily referred to as BIOS. Also, the processor 200 is connected to the display section 500 via an interface circuit 512 complying with a standard for an interface (referred to as "I/F (B)" in the drawing) where a data transfer rate is relatively low, such as SPI (Serial Peripheral Interface). By a predetermined signal including image data (second image data) generated by the processor 200 being transmitted to the display section 500, a predetermined image is displayed on the display section 500. Moreover, the processor 200 includes a collaborative communication section 250 having a configuration equivalent to that of the collaborative communication section 150 provided in the processor 100. By transmitting or receiving a predetermined collaborative signal to or from the processor 100 described above, the processor 200 collaborates and synchronizes with the processor 100 so as to control at least the display states of the display sections 400 and 500.

Here, as the processor 200 for the present embodiment, an arithmetic circuit is adopted whose processing power is relatively low but enough to display a simple image on the display section 500. In the present embodiment a this simple image (second image) is, for example, an image having a small data volume which is not expressive or an image whose update area for screen display is limited, such as a mono-color or monochrome image or a segment image representing the time, an icon, or the like. In general, an arithmetic circuit to be adopted as this type of processor 200 executes processing operations at a low operation frequency (second operation frequency). Therefore, its power consumption can be suppressed to be low, In other words as the processor 200, an arithmetic circuit can be adopted whose processing power is relatively low (low performance) and which consumes only a small amount of power (low power) In the present embodiment, an arithmetic circuit that operates at a relatively low operation frequency of about several MHz to several tens of MHz is adopted for a favorable sensing operation by the sensor section 210. Here, the control program and the algorithm program to be executed by the processor 200 may be stored in the memory section 240 or may be embedded in the processor 200 in advance. Also, a configuration may be adopted in which the same device is used for the processor 100 and the processor 200 and is operated at a low frequency when it functions as the processor 200. In addition, a configuration may be adopted in which both of them are operated by an OS.

The sensor section 210 is sensing means such as such as an acceleration sensor, a gyro sensor, a geomagnetism sensor, an atmospheric pressure sensor, a temperature and humidity sensor, a pulse sensor, and a heart rate sensor, and is calculation means including a GPS reception section. This sensor section 210 acquires the user's physical data in exercise or daily life, biological data, geographical data, and the like (hereinafter collectively referred to as sensor data), and outputs them to the processor 200.

The input operation section 220 is input means such as a button switch, a slide switch, a microphone, and the like provided on the housing of the electronic apparatus, and outputs various operation signals generated by the user's input operations to the processor 200. In response to these signals, the processor 200 sets or controls operations in the sensor section 210 or the output section 230, or selects or sets items or information to be displayed on the display section 500 described later.

The output section 230 is an acoustic means such as a buzzer and a speaker, and an oscillating means such as a vibration motor and a vibrator. This output section 230 generates sound information such as a predetermined tone, sound pattern, a voice message and the like, or vibration information such as a predetermined vibration pattern, the intensity thereof and the like. This auditory sense or tactile sense provides or reports various types of information to a user. This output section 230 may generate predetermined sound information or vibration information in conjunction with various information displayed on the display section 400 or the display section 500 described later.

The memory section 240 stores sensor data acquired from the sensor section 210 and the like in a predetermined storage area. Also, the memory section 240 stores data to be used when the predetermined control program or algorithm program is executed in the processor 200, data to be generated at that time, data to be displayed on the display section 500, and the like. Also, in the memory section 240, a control program or algorithm program to be executed in the processor 200 may be stored. Note that the memory section 140 may be configured integrally with the memory section 140 connected to the above-described processor 100.

The light source section 300 includes, although omitted in the drawing, a back light and a front light (or edge light) formed of for example, LEDs (light emitting elements), and a light-emission driving circuit for causing the back light and the front light to emit light in a predetermined light-emitting status. In addition, in the light source section 300, in accordance with the display statuses of the display section 400 and the display section 500 described later and the user's input operation on the input operation sections 120 and 220, the light-emitting status of the back light and the front light controlled. That is, in the light source section 300, the light-emitting status is controlled based on a control signal from the processor 100 or the processor 200 operating in conjunction with each other. Here, the back light is arranged on the back surface side (opposite side of the visual field side of the user) of the display panel 430 having a transmissive type panel structure and, on the other hand, the front light (or edge light) is arranged on the visual field side or side surface side of the display panel 530. Also, the light-emission driving circuit controls light-on (ON) and light-off (OFF) states of the hack light and the front light and light-emission luminance based on a control signal outputted from the processor 100 or the processor 200.

The display section 400 includes a driver circuit (or driver IC; first driver circuit) 410 and the display panel 430 with a transmissive type panel structure (first display panel), as shown in FIG. 1. The driver circuit 410 includes an interface circuit (abbreviated as "INTERFACE" in the drawing) 412, a frame memory (abbreviated as "MEMORY" in the drawing) 414, an LCD controller (in the drawing, abbreviated as "CONTROLLER") 416, a scan driver 418, and a data driver 420. Here, as described above, the interface circuit 412 is connected to the processor 100 via an interface I/F (A) with a relatively high data transfer rate such as a serial interface such as MINI or a parallel interface. The frame memory 414 stores image data generated by the processor 100 and transmitted via the above-described interface circuit 412 for each screen of the display panel 430. The LCD controller 416 reads out image data stored in the frame memory 414 for each address, controls the scan driver 418 and the data driver 420 to sequentially write in the display panel 430 at a predetermined frame rate, and thereby causes an image based on the above-described image data to be displayed.

To the display panel 430, for example, it is possible to apply a transmissive, type TFT (Thin Film Transistor) color liquid-crystal panel, and a color image, moving image, or the like based on image data generated in the processor 100 is displayed by the driver circuit 410 in a high-functionality display format. Also, the display panel 430 is arranged on the back surface side of the display section 500 described later and is arranged such that the display area of the display panel 430 and the display area of the display panel 530 overlap in a planar view. With this, in a state in which a color image, moving image, or the like is being displayed on the display panel 430, the back light arranged on the back surface side of the display panel 430 is turned on, and thereby causes a high-luminance color image or the like to be projected and visually recognized by the user. In this display panel 430, since a color image, moving image, or the like is displayed in a high-functionality display format, it is required to have high-definition display capability with a high response speed. In other words, the power consumption of the display panel 430 is high.

The display section 500 includes a driver circuit (or driver IC; second driver circuit) 510 and the display panel (second display panel) 530, as shown in FIG. 1. As with the above-described driver circuit 410, the driver circuit 510 includes an interface circuit (in the drawing, abbreviated as "INTERFACE") 512, an image memory (in the drawing, abbreviated as "MEMORY") 514, an LCD controller (in the drawing, abbreviated as "CONTROLLER") 516, a common driver 518, and a segment driver 520. Here, as described above, the interface circuit 512 is connected to the processor 200 via an interface I/F(B) with a relatively low data transfer rate such as a serial interface such as SPI. The image memory 514 stores image data generated by the processor 200 and transmitted via the above-described interface circuit 512. The LCD controller 516 reads out image data stored in the image memory 514 for each address, controls the common driver 518 and the segment driver 520 to perform display for each screen of the display panel 530 or in a specific area in the display panel 530 at a predetermined frame rate, and thereby causes an image based on the above-described image data to be displayed.

To the display panel 530, it is possible to apply a liquid-crystal panel of a PN (Polymer Network) type or PD (Polymer Dispersed) type capable of monochrome display of a reflection type with relatively high reflectivity and excellent outdoor viewability and also capable of semi-transmissive display and full-transmissive display, and a mono-color or monochrome image, segment image, or the like based on the image data generated in the processor 200 is displayed by the driver circuit 510 in a simple display format As described above, the display panel 530 is arranged on the visual field side of the display panel 430 of the display section 400 and is arranged such that the display area of the display panel 530 and the display area of the display panel 430 overlap in a planar view, As a result, by a monochrome image, segment image, or the like being displayed on the display panel 530, a simple image or the Like with high outdoor viewability is visually recognized by the user. In this display panel 530, since a mono-color or monochrome image, segment image, or the like is displayed a simple display format, it is only required to have low display capability with relatively low definition and a low response speed. In other words, the power consumption of the display panel 430 is low.

In the present embodiment, for example, while a monochrome image or segment image is being displayed on the display panel 530, a color image is displayed on the display panel 430 of the display section 400 described above to turn on the back light of the light source section 300, whereby an image acquired by the color image of the display panel 430 and the monochrome image, segment image, or the like of the display panel 530 being superimposed (hereinafter referred to as "superimposed image" for convenience) is visually recognized by the user, as will be described further below. Note that display formats achieved by the display sections 400 and 500 in the present embodiment will be described in detail further below.

Also, each of the above-described structures achieves respective functions by drive power supplied from a power supply section 600, as shown in FIG. 1. In the mount-type or portable-type electronic apparatus, as the power supply section 600, a primary battery such as a commercially-available button-shaped battery, a secondary battery such as a lithium-ion battery, a power supply by energy harvest technology for generating electricity by energy such as vibrations, light, heat, or electro-magnetic waves, or the like may be applied singly or in combination.

Note that, although the processor 100 and the processor 200 have separate structures in the present embodiment as shown in FIG. 1, the present invention is not limited thereto. For example, the processor 100 and the processor 200 may be mounted and integrated on a single semiconductor substrate in a form of System-on-a-Chip (SOC). In this case as well, the interface I/F(A) for connecting the processor 100 and the display section 400 and the interface I/F(B) for connecting the processor 200 and the display section 500 are individually provided.

Also, although omitted in the present embodiment, the processor 100 and the processor 200 may include a communication interface section (hereinafter abbreviated as "communication I/F section") which transmits and receives various data and signals by a predetermined communication method using a wire or wirelessly to and from a device (hereinafter referred to as an "external device") provided outside an electronic apparatus having the display device 10. Here, in a case where the (high-power, high-performance) processor 100 is provided with the communication I/F section to transmit and receive data and the like via wireless communication to and from an external device (for example, a high-functionality information processing device such as a smartphone or personal computer), a wireless communication method capable of transmitting and receiving data with a relatively large capacity at high speeds is applied, such as BLUETOOTH (registered trademark) communication or WI-FI (wireless fidelity (registered trademark) communication. On the other hand, in a case where the (low-power, low-performance) processor 200 is provided with the communication I/F section to transmit and receive data and the like via wireless communication to and from an external device (for example, a sensor device attached to another part of the body), a wireless communication method with low power consumption is applied, such as BLUETOOTH (registered trademark) Low Energy (BLE) communication.

Display Device Control Method

Next, the display device control method according to the present embodiment is described. Here, a control method is described which is used when the user performs exercise such as running or walking or in the user's daily life with the electronic apparatus having the above-described display device 10 applied therein being worn on the body or carried, and various information is provided by being displayed on the display panel. Here, a series of processing operations described below are achieved by the processor 100 of the first display block BL1 and the processor 200 of the second display block BL2 executing a predetermined algorithm program in mutual collaboration. Also, in this specification, in the display device control method described below, various operation statuses of the display device including each display mode for causing an image to be displayed by using the display panels 430 and 530 and a display halt mode for disabling an image to be displayed on any of the display panels 430 and 530 are referred to as "operation modes". That is, each display mode and the display halt mode described below is one format of the operation mode of the present embodiment.

Figure 2:
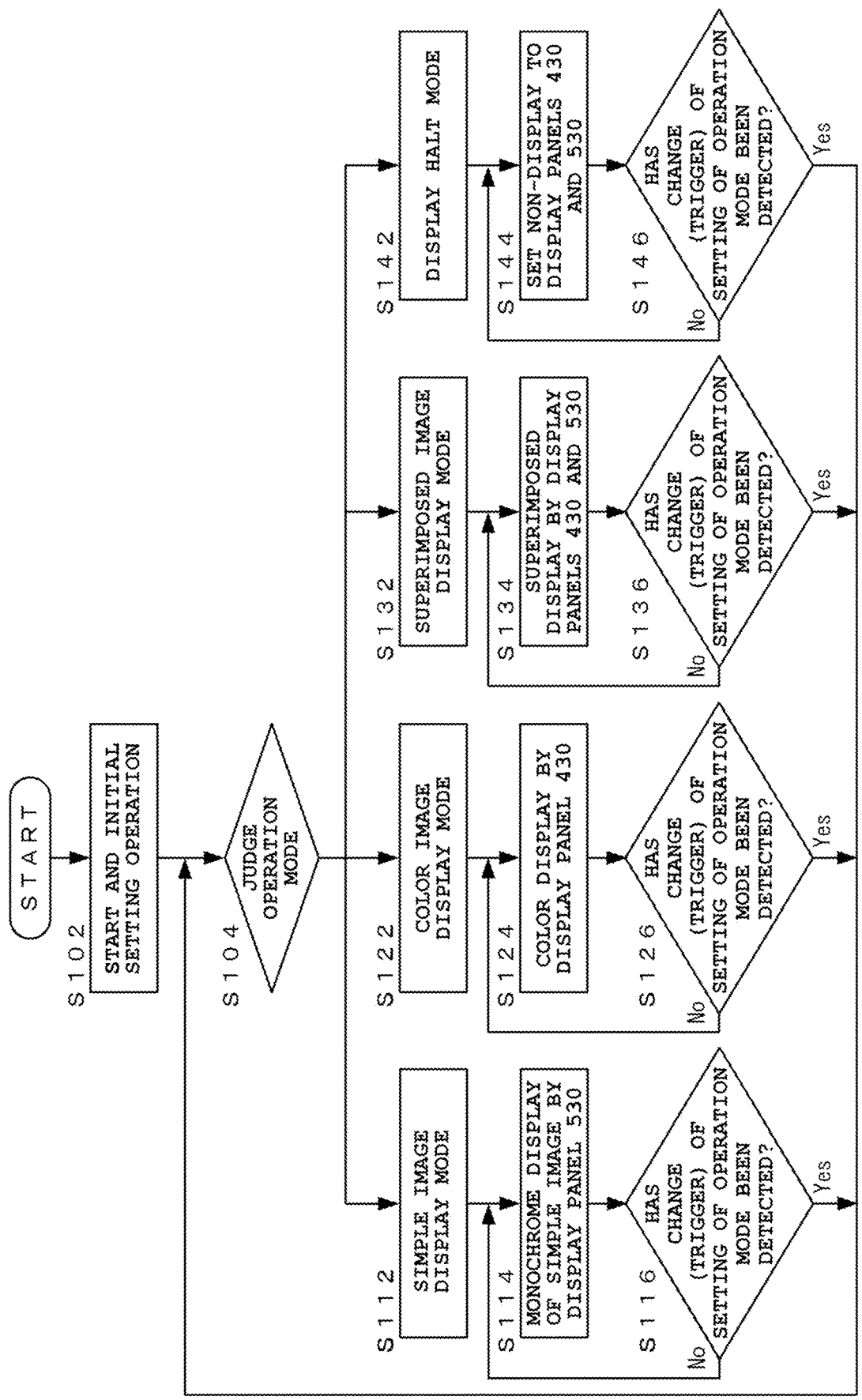
FIG. 2 is a flowchart showing an example of a control method for the display device according to the first embodiment.
Figure 3:
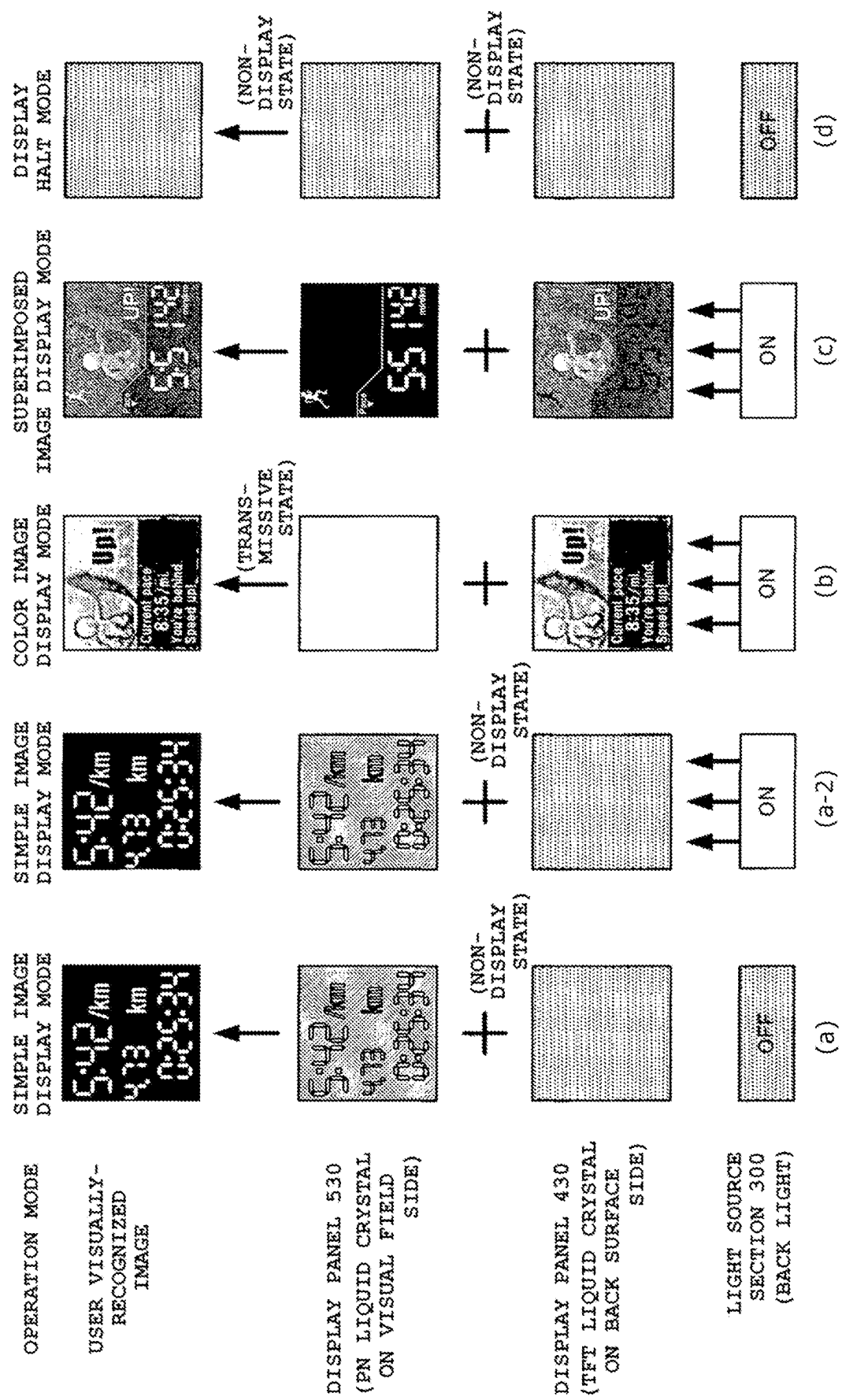
FIG. 3 is a diagram showing display modes of the display device according to the first embodiment.

FIG. 2 is a flowchart showing an example of a control method for the display device according to the first embodiment;

FIG. 3 is a diagram showing display formats of the display device according to the first embodiment;

In the control method for the display device 10 according to the present embodiment, first, when the user operates the above-described input operation section 220 to cause drive power to be supplied from the power supply section 600 to start the display device 10, a function and application (software) to be executed in an initial state are set in the processors 100 and 200, as shown in the flowchart of FIG. 2. Also, simultaneously, an operation mode regarding display status and power consumption in the display device 10 is initially set (Step S102). Here, the operation mode initially set at Step S102 may be set (defined) in advance in a program to be executed in the processors 100 and 200 or may be arbitrarily set by the user.

In the present embodiment, as operation modes of the display device 10, a "SIMPLE IMAGE DISPLAY MODE" (second operation mode), a "COLOR IMAGE DISPLAY MODE" (first operation mode), a "'SUPERIMPOSED IMAGE DISPLAY MODE" (sixth operation mode), and a "DISPLAY HALT MODE" (fifth operation mode) are prepared in advance, and one of the operation modes is selectively set.

Next, the processors 100 and 200 judge the operation mode initially set at Step S102 (Step S104) and, in accordance with the result, control the display format of the image in the display sections 400 and 500. In the following descriptions, the display format (an example of screen display on each of the display panels 430 and 530) and the processing operation in each operation mode are explained.

(1) Simple Image Display Mode

When the display device 10 is judged at Step S104 as being set in the simple image display mode (Step S112), a simple image such as time or an icon is displayed in segment display or monochrome display on the display panel 530 arranged on the side of the user's visual field among the display panels 430 and 530 arranged overlapping with each other in a planar view, as shown in an intermediate stage and a lower stage in FIG. 3(*a*). Also, the display panel 430 arranged on the back surface side of the display panel 530 is set in a non-display state where no image is displayed (Step S114) Also, in conjunction with the non-display state of the display panel 430, the back light of the light source section 300 arranged on the back surface side of the display panel 430 is set in a non-light-emitting state.

In this simple image display mode, the processor 200 of the second display block BL2 controls the display of the simple image on the display panel 530. Also, simultaneously, only the entire first display block BL1 or the function associated with display of the display panel 430 of the first display block BL1 (the display function and the display section 400 of the processor 100) enters a halt state (sleep state) or a state (power supply OFF state) in which drive power from the power supply section 600 is interrupted.

That is, in the simple image display mode, in the processor 200, the operation of the function associated with display of the display of the display panel 530 is continued in addition to the functions associated with control of the sensor section 210, the input operation section 220, and the output section 230. This operation in the display device 10 is performed by the processor 100 and the processor 200 transmitting and receiving a collaborative signal via the collaborative communication section 150 and 250 for mutual collaboration.

Here, in the present embodiment, the halt state (sleep state) is a power-saving state where power is controlled so as to be supplied only to components required at minimum and is, for example, a state called standby or sleep of S1 or S3 among the sleeping modes S0 to S5 defined in ACPI (Advanced Configuration and Power Interface), which is published unified standard regarding power source control and components, Note that the halt state may be referred to as standby mode, sleep mode, power-saving state or the like.

As a result, in the simple image display mode, a simple image displayed on the display panel 530 is visually recognized by the user, as shown in an upper stage of FIG. 3(*a*), and power consumption by the first display block BL1 is reduced. Here, as described above, since the display panel 530 has a panel structure capable of monochrome display with relatively high reflectivity, it is not required to cause the back light of the light source section 300 to emit light. Also, since the image displayed on the display panel 530 is a simple image with a small data capacity, the power consumption of the display device 10 is reduced as compared to the case in which a color image or the like is displayed on the display panel 430 in the color image display mode and the superimposed image display mode described later.

Next, in the state in which the display device 10 is in the simple image display mode, it is monitored, constantly or at predetermined timing, whether an event (trigger) of changing the setting of the operation mode has been detected (Step S116) This monitoring operation is performed by the processor 200 of the second display block BL2. Here, the event of changing the setting of the operation mode of the display device 10 indicates a case in which, for example, the setting of the display status of each image by application, the operation of the input operation section 220 by the user, the detection of a specific physical, biological, or geographic status by the sensor section 210, a lapse of time (timeout) set in advance from a predetermined state (for example, an end of the input operation by the user), or a decrease of the remaining amount of a battery in the power supply section 600 has been detected.

At Step S116, if an event of changing the setting of the operation mode has not been detected, the processor 200 continues the operation in the simple image display mode in the display device 10. On the other hand, if an event of changing the setting of the operation mode has been detected, the processor 200 returns to Step S104 to again judge an operation mode newly set based on the above-described event and, in accordance with the result, control the display format of the image on the display sections 400 and 500.

In the above descriptions of the simple image display mode, the screen display of the display device 10 is visually recognized by the user under a relatively bright environment such as outdoors. However, since the display panel 530 where an image is to be displayed has a panel structure capable of monochrome display with relatively high reflectivity, it may be difficult to visually recognize screen display under a dark environment. In that case, the operation of the input operation section 220 by the user is detected and the control of causing the back light or the front light (or edge light) of the light source section 300 to emit light is performed, whereby the viewability of screen display can be improved. The display mode in which the back light or the front light (or edge light) of the light source section 300 emits light in the simple image display mode (second operation mode) as described above and thereby brightly illuminates a simple image displayed on the display panel 530 so that the user can visually recognize the image corresponds to a third operation mode according to the present invention (see FIG. 3(a-2) and FIG. 8(a-2), for example). Specific application examples therefor are described in modification examples described later.

This simple image display mode using the second display block BL2 is applied to a case in which, for example, the user not operating a wrist terminal for an electronic apparatus having the display device 10 glances screen display to check information such as time or a measurement value acquired by a sensor. In this case, as described above, the simple image is on segment display or monochrome display. Thus, although expressive power of screen display is decreased, the processor 200 with low processing capacity is used, and thus the power consumption of the display device 10 can be significantly reduced, and the driving time of the electronic apparatus can be prolonged, Note that, in this simple image display mode, the image displayed on the display panel 530 may be not on monochrome display but on single color display or multi-color display.

(2) Color Image Display Mode

At the above-described Step S104, when the display device 10 is judged as being set in the color image display mode (Step S122), a high-functionality image such as a color image or moving image is displayed on the display panel 430 arranged on the back surface side among the display panels 430 and 530, as shown in an intermediate stage and a lower stage of FIG. 3(b). Also, the display panel 530 arranged on the visual field side is set in the non-display state in which no image is displayed and also in a transmissive state of transmitting the image displayed on the display panel 430 (Step S124) Also, in conjunction with the display status of the display panel 430, the back light of the light source section 300 is set in a light-emitting state.

In this color image display mode, the processor 100 of the first display block BL1 controls the display of a color image or the like on the display panel 430 and the light emission of the back light in the light source section 300. Also, simultaneously, the processor 200 of the second display block BL2 performs control such that the display panel 530 is in a transmissive state. Here, in a case where a PN-type liquid-crystal panel is applied as the display panel 530 as described above, it is required to apply a predetermined voltage to the display panel 530 to achieve the transmissive state, In that case, since the display panel 530 is set in the non-display state, the processor 200 is not required to perform processing operation for causing the display panel 530 to display an image. That is, in the color image display mode, the operations of all functions in the processor 100 are continued, and the operation of a function for controlling the display panel 530 to enter a transmissive state and functions associated with the control of the sensor section 210, the input operation section 220, and the output section 230 in the processor 200 are continued without a halt. This operation in the display device 10 is performed by the processor 100 and the processor 200 in mutual collaboration.

As a result, in the color image display mode, the color image or the like displayed on the display panel 430 is visually recognized by the user, as shown in an upper stage of FIG. 3(b) and, since the processing load in the display function of the processor 200 is reduced, power consumption by the second display block BL2 is reduced. Here, as described above, since the display panel 430 has a transmissive type panel structure, it is required to cause the back light of the light source section 300 to emit light. Also, since the image displayed on the display panel 430 is a color image, moving image, or the like with a large data capacity, the power consumption of the display device 10 is increased as compared to the case where a simple image is displayed on the display panel 530 in the above-described simple image display mode, but a clear color image or the light with high luminance can be displayed.

Next, in the state in which the display device 10 is in the color image display mode, it is monitored by the processor 100 of the first display block BL1 or the processor 200 of the second display block BL2 where the display function has been set in a transmissive state whether an event (trigger) of changing the setting of the operation mode has been detected (Step S126). If that event has not been detected, the processors 100 and 200 continue the operation in the color image display mode. On the other hand, if that event has been detected, the processors 100 and 200 return to Step S104 to control the display format of the image on the display sections 400 and 500 in accordance with the judgment result of an operation mode newly set. Here, in the color image display mode, since the operations of all functions of the processor 100 of the first display block BL1 are continued, the operation of the input operation section 120 by the user is included as an event of changing the setting of the operation mode of the display device 10.

This color image display mode using the first display block BL1 is applied in the electronic apparatus with the display device 10 mounted thereon when, for example, the user actively operates a wrist terminal. In this case, since the processor 100 with high processing power has been used as described above, the power consumption of the display device 10 is increased but high-definition color graphic images, animation images and the like can be favorably displayed. Also, the response speed, operability, and the like of the display device 10 with respect to the input operation by the user can be optimized to improve the usability of the user.

(3) Superimposed Image Display Mode

At the above described Step S104, when the display device 10 is judged as being set in the superimposed image display mode (Step S133), a simple image such as time, a measurement value, or icon is displayed by segment display or monochrome display on the display panel 530 arranged on the side of the user's visual field, as shown in an intermediate stage and a lower stage of FIG. 3(c). Also, a high-functionality image such as a color image or moving image is displayed on the display panel 430 arranged on the back surface side of the display panel 530 (Step S134) Also, in conjunction with the display status of the display panel 430, the back light of the light source section 300 is set in a light-emitting state.

In this superimposed image display mode, the processor 100 of the first display block BL1 controls the display of a color image or the like on the display panel 430 and the light emission of the back light in the light source section 300. Also, simultaneously, the processor 200 of the second display block BL2 controls the display of a simple image on the display panel 530. That is, in the superimposed image display mode, the operations of all functions of the processors 100 and 200 are continued. These operations in the display device 10 are performed by the processor 100 and the processor 200 in mutual collaboration.

As a result, in the superimposed image display mode, a colorful superimposed image with rich expressive power, which has been acquired by the color image or the like displayed on the display panel 430 and the simple monochrome image or segment image being superimposed, is visually recognized by the user, as shown in an upper stage of FIG. 3(c). In this case, since both of the first display block BL1 and the second display block BL2 are operated, the power consumption of the display device 10 is increased. However, since the processor 100 with high processing power has been used, the response speed, operability, and the like of the display device 10 with respect to the user's input operation can be optimized to improve usability for the user.

Next, in the state in which the display device 10 is in the superimposed image display mode, it is monitored by the processor 100 or 200 whether an event (trigger) of changing the setting of the operation mode has been detected (Step S136). If that event has not been detected, the processors 100 and 200 continue the operation in the superimposed image display mode. On the other hand, if that event has been detected, the processor 100 and 200 return to Step S104 to control the display format of the image on the display sections 400 and 500 in accordance with the judgment result of an operation mode newly set. Here, in the superimposed image display mode as well, the operation of input operation section 120 by the user is included as an event of changing the setting of the operation mode of the display device 10, as with the above-described color image display mode.

Note that, when the update frequency and changes (motions) of the screen display of the color image or the like displayed on the display panel 430 are less and the update frequency and changes (motions) of the screen display of the simple image displayed on the display panel 530 is more in the above-described superimposed image display mode, only the simple image with a small data capacity displayed by the processor 200 on the display panel 530 is required to update. Therefore, power consumption by the first display block BL1 can be reduced as much as possible.

(4) Display Halt Mode

At the above-described Step S104, when the display device 10 is judged as being set in the display halt mode (Step S142), a non-display state is set in which no image is displayed on both of the display panels 430 and 530, as shown in an intermediate stage and a lower stage of FIG. 3(d) (Step S144) Also, the back light of the light source section 300 arranged on the back surface side of the display panel 430 is also set in a non-light-emitting state.

In this display halt mode, only the entire first display block BL1 or the function associated with the display of the display panel 430 of the first display block BL1 enters a halt state (sleep state) or a power supply OFF state. Also, simultaneously, only the function associated with display of the display panel 530 of the second display block BL2 (the display function and the display section 500 of the processor 200) enters a halt state (sleep state) or a power supply OFF state. That is, in the display halt mode, in the processor 200, the operations of the functions associated with the control of the sensor section 210, the input operation section 220, and the output section 230 other than the functions associated with the display of the display panel 530 are continued without a halt. These operations in the display device 10 are performed by the processor 100 and the processor 200 in mutual collaboration.

As a result, in the display halt mode, no image is visually recognized by the user, as shown in an upper stage of FIG. 3(d) Also, power consumption by the first display block BL1 and the second display block BL2 is significantly reduced (for example, to substantially zero).

Next, in the state in which the display device 10 is in the display halt mode, whether an event (trigger) of changing the setting of the operation mode has been detected is monitored by the processor 200 of the second display block BL2 in which the display function is in a halt state (Step S146). If that event has not been detected, the processor 200 continues the operation in the display halt mode. On the other hand, if that event has been detected, the processor 200 returns to Step S104 to control the display format of the image on the display sections 400 and 500 in accordance with the judgment result of an operation mode newly set.

In the present embodiment, the above-described series of processing operation is repeatedly performed. Accordingly, for example, operation specifications of the display device as follows can be achieved. That is, in a state in which the user who has activated the electronic apparatus having the display device 10 is operating, for example, the touch panel or a button switch of the input operation section 120 or 220 or in a state in which an input operation by the user has been detected, the operation mode is set by the application in the color image display mode or the superimposed image display mode. As a result, as described above, the color image or the like displayed on the display panel 430 or an superimposed image acquired by the color image or the like and the simple image displayed on the display panel 530 being superimposed is visually recognized by the user. Here, in the color image display mode, the function associated with display of the display panel 530 is set in a transmissive state.

Then, when the user ends the operation on the touch panel, button switch, or the like or when no input operation by the user is detected, the setting of the operation mode is changed by the application to the simple image display mode after a predetermined time (for example, thirty seconds) elapses. As a result, the simple image displayed on the display panel 530 is visually recognized by the user. In this simple image display mode, the entire first display block BL1 or the function associated with display of the display panel 430 is set in a halt state or a power supply OFF state.

Note that, when the above-described series of processing operations is being performed in the present embodiment the processors 100 and 200 constantly monitor for an input operation for interrupting or ending a processing operation or the change of the operation status and, when an input operation or the change of the status is detected, forcibly ends the processing operation. Specifically, the processors 100 and 200 detect a power supply OFF operation by the user, a decrease in the remaining amount of the battery in the power supply section 600, an occurrence of an anomaly in a function or application being executed, or the like and forcibly discontinues and ends the series of processing operations.

Program Structure

Note that any program can be used to achieve the control method for the display device according to the present embodiment without limitation as long as it can execute the series of processing operations as shown in the above-described flowchart In the present invention, the program structure described below can be applied.

In the present embodiment the processor 100 of the first display block BL1 has incorporated therein basic software for executing and controlling the entire operation and function of the display device 10. Also, the processor 200 of the second display block BL2 has incorporated therein single-function software for executing only a specific function even in a state in which the basic software incorporated in the processor 100 is not operating (for example, in a shutdown state or a power supply OFF state of the processor 100). Here, the basic software incorporated in the processor 100 has a function corresponding to an OS (Operating System) incorporated in a general computer, and the single-function software incorporated in the processor 200 has a function corresponding to a BIOS (Basic Input Output System) or the like incorporated in a general computer. In the present embodiment, the single-function software incorporated in the processor 200 is a small program just enough to, for example, display an image of a timepiece (time) on the display panel 530.

That is, in a state in which the display device 10 has been activated, the predetermined control program or algorithm program is executed under the control of the basic software (OS-level program) incorporated in the processor 100, and thereby controls the operation and function of the processors 100 and 200. On the other hand, in a shutdown state (or power supply OFF state of the processor 100) as well in which the basic software incorporated in the processor 100 is not operating, the supply of drive power to the processor 200 is maintained and the operation of at least the single-function software (BIOS-level program) is continued in the present embodiment. As a result, timepiece display or the like is performed on the display panel 530 by the processor 200 irrespective of the operation status of the basic software or the power supply ON or OFF state of the display device 10. Here, the display panel 530 is capable of display with relatively high reflectivity and excellent outdoor viewability. Therefore, even when the user visually recognizes the screen display of the display device 10 under a relatively bright environment such as outdoors, it is not required to cause the back light of the light source section 300 to emit light.

Accordingly, in the above-described simple image display mode, by the single-function software incorporated in the processor 200 being used, a simple image with a small data capacity such as timepiece display can be displayed on the display panel 530 of the second display block BL2. In this case, it is possible to constantly provide the user with useful information such as time and also reduce the power consumption of the display device 10 as much as possible to prolong the driving time of the electronic apparatus having the display device mounted thereon.

Also, in the simple image display mode, when an image displayed on the display panel 530 cannot be favorably visually recognized under a dark environment, the operation of the input operation section 220 by the user is detected by the single-function software incorporated in the processor 200 to perform control of causing the back light or front light (or edge light) of the light source section 300 to emit light. Accordingly, the power consumption of the display device 10 is reduced as much as possible, and light-emission control can be performed on the light source section 300 as required so as to improve the viewability of screen display.

Also, in the color image display mode, under the control of the basic software incorporated in the processor 100, a high-functionality image such as a color image or moving image can be displayed on the display panel 430 of the first display block BL1. Also, in the superimposed image display mode, under the control of the basic software incorporated in the processor 100, a high-functionality image can be displayed on the display panel 430 of the first display block BL1 and a simple image can be displayed on the display panel 530 of the second display block BL2. In these cases, screen display with rich expressive power can be achieved, and the response speed, operability, and the like of the display device 10 can be optimized to improve usability.

Note that, as a program structure for achieving the above-described control method for the display device, the case has been described in the present embodiment in which the basic software having a function corresponding to an OS is operated in the processor 100 and the single-function software having a function corresponding to BIOS is operated in the processor 200. However, the present invention is not limited thereto. For example, a program structure may be adopted in which both of the basic software and the single-function software are incorporated in one of the processors 100 and 200 and the processor 100 and the processor 200 mutually collaborate, whereby the above-described control method for the display device is achieved.

Verification of Operations and Effects

Figure 4:
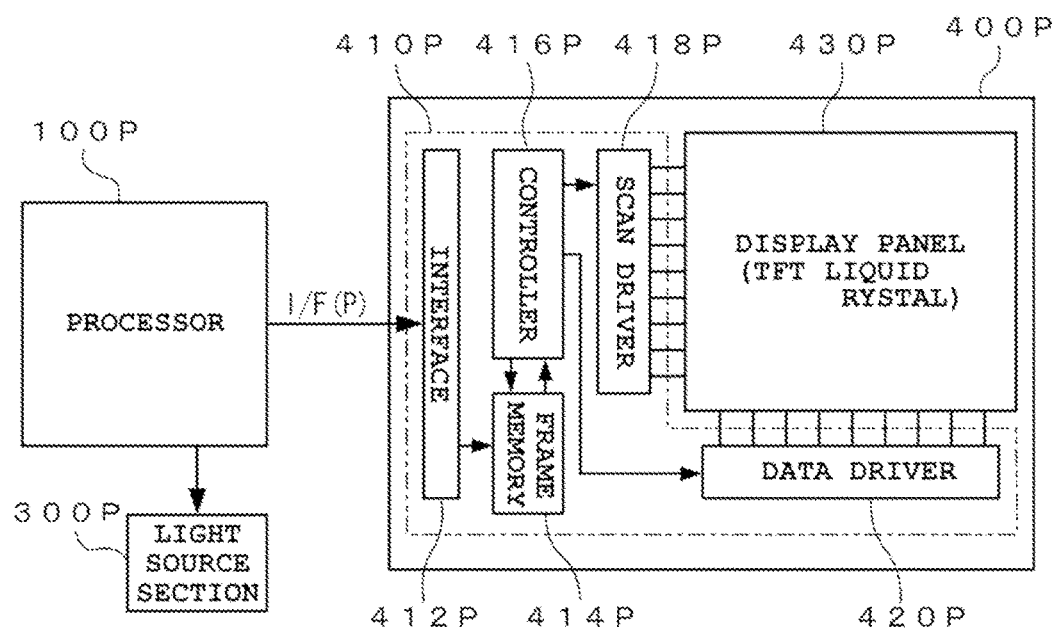
FIG. 4 is a schematic block diagram showing a comparative example for describing an operation effect of the first embodiment.
Figure 5:
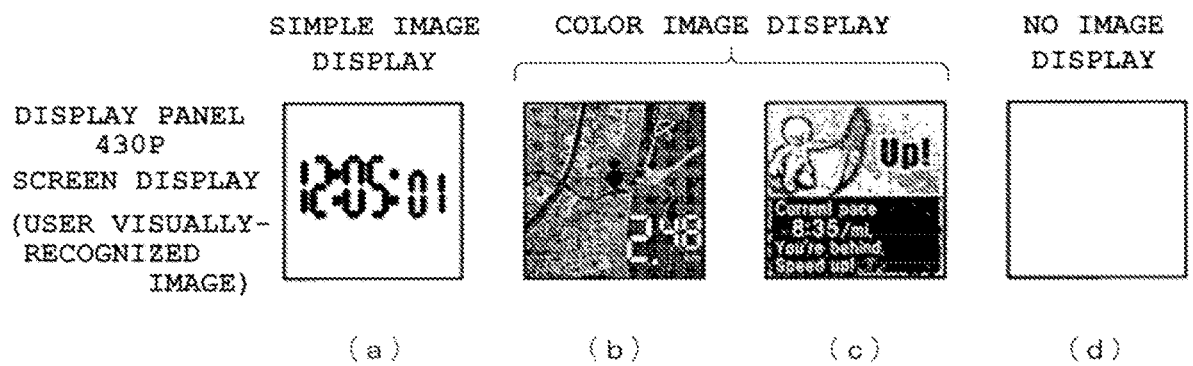
FIG. 5 is a diagram showing examples of the screen display of the comparative example.

Next, operations and effects of the display device according to the present embodiment and its control method are specifically described by presenting a comparative example. FIG. 4 is a schematic block diagram showing a comparative example for describing an operation effect of the present embodiment, and FIG. 5 is a diagram showing examples of the screen display of the comparative example. Here, to clarify comparison in structure and control method between the present embodiment and the comparative example, a structure equivalent to that of the present embodiment is provided with an equivalent reference character for description.

A display device in the comparative example mainly has, for example, a processor 100P, a light source section 300P, and a display section 400P, and the display section 400P includes a transmissive type display panel 430P and a driver circuit 410P, as shown in FIG. 4, As with the above-described embodiment the driver circuit 410P includes an interface circuit 412P, a frame memory 414P, an LCD controller 416P, a scan driver 418P, a data driver 420P.

In this display device, as with the above-described present embodiment, image data generated by the processor 100P in accordance with the setting of application and the user's input operation is written in the frame memory 414P of the driver circuit 410P, by which a predetermined image is displayed in an entire display area of the display panel 430P. Then, by the light of the light source section 300P being emitted from the back surface side of the display panel 430P, an image displayed on the display panel 430P is projected to the side of the users s visual field and is visually recognized by the user.

Here, in order to cause a high-definition image such as a high-definition color image as described above or smooth moving image or animation to be displayed on the display panel 430P, it is required to apply an arithmetic operation circuit with relatively high processing power and high power consumption (high-power, high-performance processor) as the processor 100P. In addition, it is required to connect the processor 100P and the driver circuit 410P via an interface I/F(P) supporting standards with a relatively high data transfer rate such as, for example, MIPI or a parallel interface. Also, as the display panel 430P, it is required to apply a transmissive type TFT color liquid-crystal panel or the like supporting display of color images, moving images, and the like.

In this display device, even in a case where a simple image such as timepiece display is displayed on the display panel 430P, when an image with frequent updates or changes (for example, second display in the drawing) is included as shown in FIG. 5(a), it is required to frequently generate image data for the entire display area of the display panel 430P by the processor 100P and repeat the operation of writing the image data via the interface I/F(P) in the driver circuit 410P. Thus, it is required to cause the processor 100P to constantly operate, and a transition to a power-saving state or halt state cannot be made. On the other hand, as shown in FIG. 5(b) and FIG. 5(c), when an image with a less frequency updates or changes of screen display (for example, map or exercise support image) is to be displayed on the display panel 430P for a predetermined period, even if that image is a high-functionality image, the image data generated by the processor 100P and written in the driver circuit 410P is retained in the frame memory 414P. Thus, during the display of that image, the processor 100P can be in a power-saving state or halt state until a request for generating next image data is provided. Note that, as with the above-described present embodiment (refer to FIG. 2 and FIG. 3), FIG. 5(a) to FIG. 5(d) show examples (simple image, color image, or no image display) of screen display in each mode displayed on the display panel 430P when the display mode is switched due to the setting of the application, the user's input operation, or the like.

In this manner, in the display device of the comparative example, since the processor 100P singly controls screen display in all display modes in the display section 400P, the processing load is high and, in particular, when an image with frequent updates or changes is displayed, the processor 100P is constantly operated, which increases power consumption. Also, even when a simple image is displayed on the display panel 430P, it is required to use the display panel 430P supporting display of a high-definition color image, moving image, or the like and the processor 100P with high performance. Thus, the processing power of the processor 100P and the display performance of the display panel 430P, become in a surplus state, and the performance of the display section 400P cannot be effectively used.

By contrast, the present embodiment has the first display block BL1 including the processor 100 with relatively high processing power and the display section 400 with high display performance and the second display block BL2 including the processor 200 with relatively low processing power and the display section 500 with low display performance. In addition, the processors 100 and 200 mutually collaborate and are controlled to properly use the first display block BL1 and the second display block BL2 in accordance with an operation mode.

That is, as described above, in the simple image display mode for displaying a simple image such as time or an icon, the second display block BL2 is operated, and the first display block BL1 is halted. On the other hand, in the color image display mode for displaying a color image, moving image, or the like, the first display block BL1 is operated, and the display function of the second display block BL2 is set in a transmissive state. Furthermore, in the superimposed image display mode for displaying a superimposed image with a simple image and a color image superimposed, both of the first display block BL1 and the second display block BL2 are operated.

Accordingly, in the present embodiment, either one of the display blocks having different processing powers and display performances is used in accordance with an operation mode to switch among a simple image such as time, a high-functionality image such as a color image, and a more colorful superimposed image. Thus, various types of information can be provided in various display formats by using a display block with appropriate processing power and display performance without impairing operability for the user. Here, when the simple image, color image, or the like is to be displayed, one of the first display block BL1 and the second display block BL2 can be caused to substantially enter a halt state or power-saving state. Thus, the power consumption of the display device 10 can be reduced, and the driving time of the electronic apparatus having the display device 10 mounted thereon can be improved.

Second Embodiment

Next, a second embodiment of the display device according to the present invention is described in detail with reference to the drawings.

Figure 6:
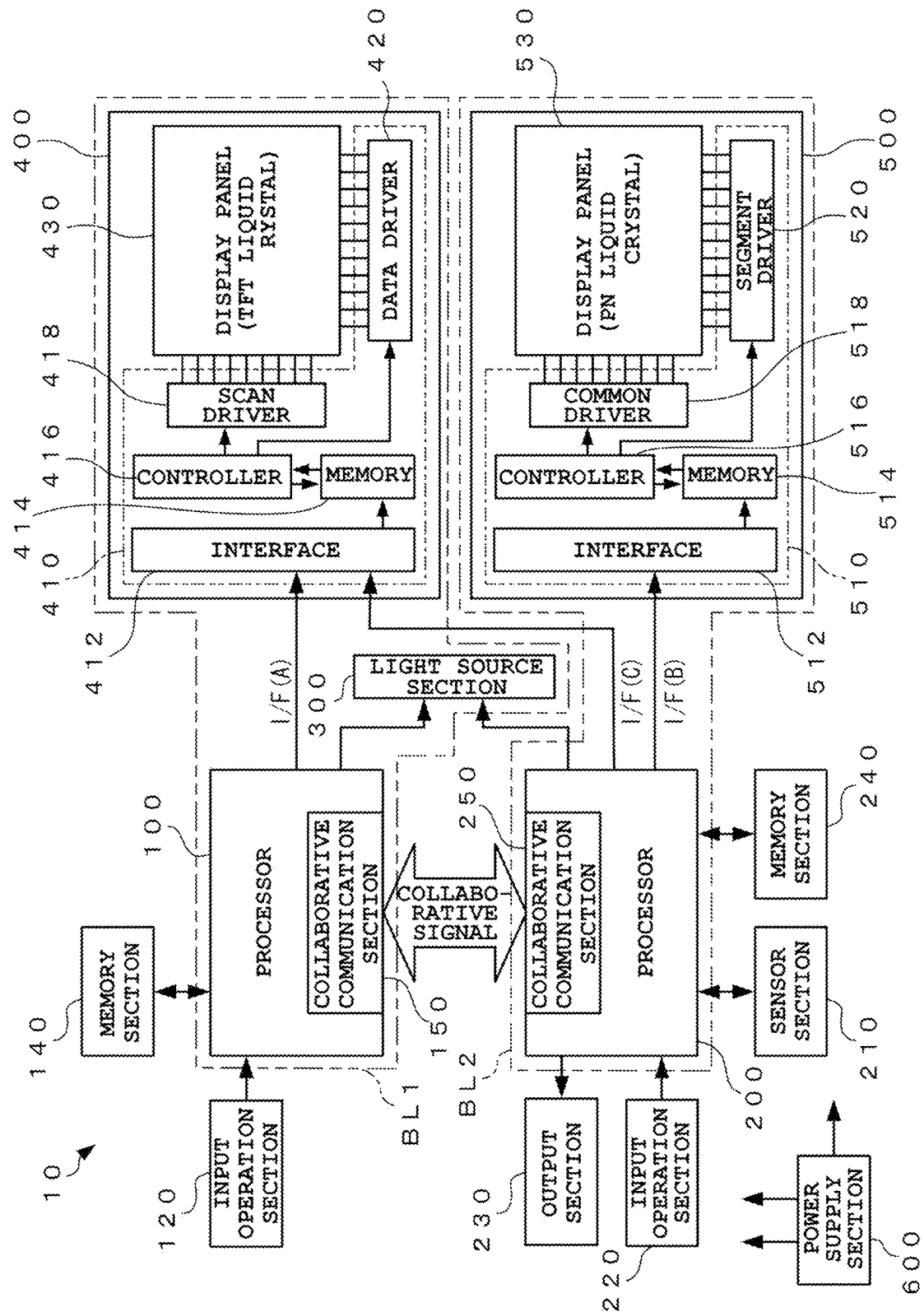
FIG. 6 is a schematic block diagram showing a second embodiment of the display device according to the present invention.
Figure 7:
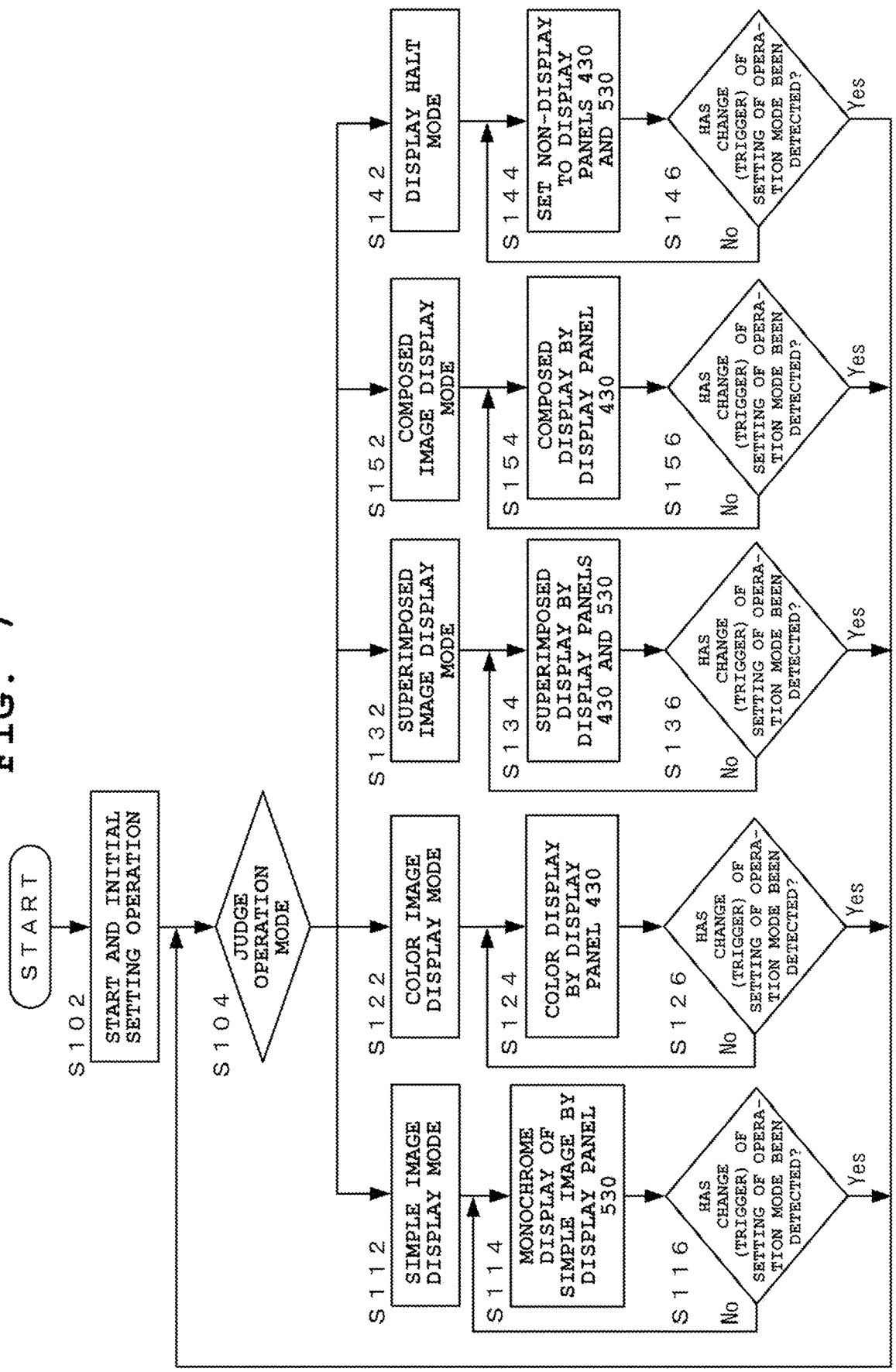
FIG. 7 is a flowchart showing an example of a control method for the display device according to the second embodiment.
Figure 8:
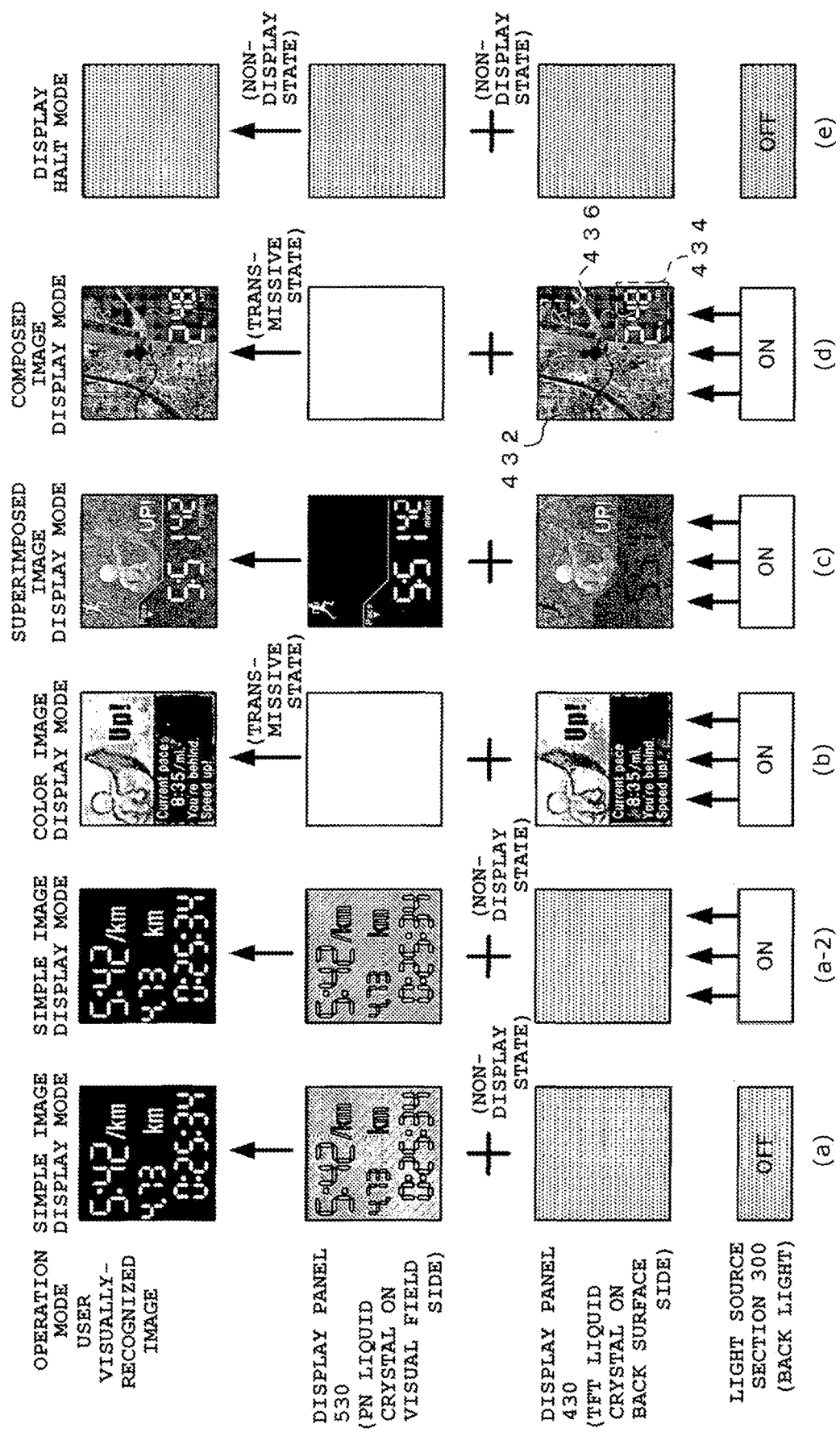
FIG. 8 is a diagram showing (first) display modes of the display device according to the second embodiment.
Figure 9:
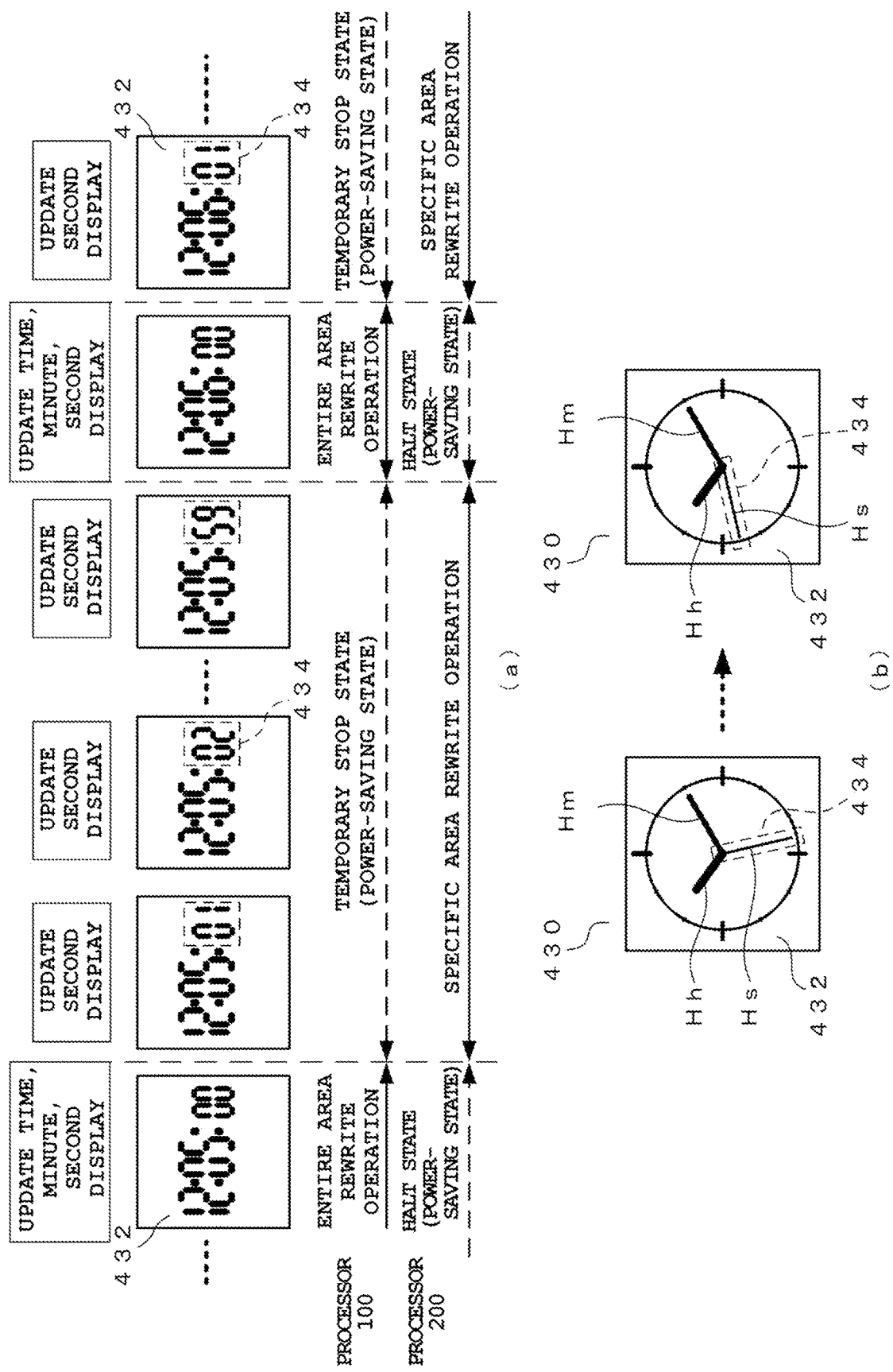
FIG. 9 is a diagram showing (second) display modes of the display device according, to the second embodiment.

FIG. 6 is a schematic block diagram showing the second embodiment of the display device according to the present invention, FIG. 7 is a flowchart showing an example of a control method for the display device according to the present embodiment, and FIG. 8 and FIG. 9 are diagrams showing display formats of the display device according to the present embodiment. Here, components and a control method equivalent to those of the above-described first embodiment are provided with the same reference numerals and descriptions therefor are simplified.

In the first embodiment, the structure has been described in which the display state of the display panel 430 is controlled by the processor 100 in the first display block BL1 and the display state of the display panel 530 is controlled by the processor 200 in the second display block BL2. The second embodiment is characterized in that a simple image based on image data generated by the processor 200 of the second display block BL2 is displayed in a specific area of the display panel 430 of the first display block Bid and is combined and displayed with an image for one screen based on image data generated by the processor 100.

In the display device 10 according to the second embodiment the processor 200 of the second display block BL2 is connected via an interface I/F(C) of predetermined standards to the interface circuit 412 of the display section 400 of the first display block Bid in the structure shown in the above-described first embodiment, as shown in FIG. 6. That is, the interface circuit 412 of the display section 400 has a plurality of interfaces of different standards, and is connected to the processor 100 via the interface I/F(A) such as MIPI, and is connected to the processor 200 via the interface I/F(C) with a relatively low data transfer rate, such as SPI.

Then, the frame memory 414 is sequentially overwritten with image data or the like transmitted from the processors 100 and 200 via the above-described individual interfaces I/F(A) and I/F(C) to the driver circuit 410 for storage. Here, in a state in which image data from one of the processors 100 and 200 has been written in the frame memory 414, when image data is written from the other processor, overwriting and storing are performed such that the latter image data becomes effective. Also, by specifying an address at the time of image data writing, overwriting is performed with only image data corresponding to the address, among pieces of image data already written in the frame memory 414. Note that the timing of transmitting image data to the driver circuit 410 from each of the processors 100 and 200 is controlled by transmitting and receiving a collaborative signal between the processors 100 and 200 for mutual collaboration and synchronization. Also, image data generated by the processor 200 is controlled so as to be selectively transmitted to one of the driver circuits 410 and 510 in accordance with an operation mode (details are described later) of the display device 10.

Accordingly, in the present embodiment, in the state in which an image for one screen such as a color image or moving image based on image data generated by the processor 100 is being displayed on the display panel 430 of the first display block BL1, a specific image based on image data generated by the processor 200 is displayed in a specific display area (specific area) with the address of the display panel 430 specified. Here, the image displayed on the display panel 430 based on the image data generated by the processor 200 is a simple image such as an image with a small data capacity or an image with a limited update area of screen display.

In the control method for the display device of the present embodiment having the above-described structure, as an operation mode of the display device 10, a "composed image display mode" (fifth operation mode) is provided in advance in addition to the operation modes including the simple image display mode, the color image display mode, the superimposed image display mode, and the display halt mode described in the above-described first embodiment and one of the operation modes is set in accordance with a result of operation mode judgment, as shown in the flowchart of FIG. 7.

(5) Composed Image Display Mode

In the composed image display mode (Step S152), as shown in an intermediate stage and a lower stage of FIG. 8(d), a composed image (fourth image) acquired by an image 432 for one screen and simple images 434 and 436 in specific areas being combined is displayed on the display panel 430 arranged on the back surface side among the display panels 430 and 530. Also, the display panel 530 arranged on the visual field side is set in a non-display state in which no image is displayed and in a transmissive state of transmitting the image displayed on the display panel 430 (Step S154). Also, in conjunction with the display status of the display panel 430, the back light of the light source section 300 is set in a light-emitting state.

In this composed image display mode, the processor 100 of the first display block BL1 controls the display of the image 432 for one screen on the display panel 430, and the processor 200 of the second display block BL2 controls the display of the simple images 434 and 436 in the specific areas on the display panel 430. Also, here, the processor 200 of the second display block BL2 performs control so that the display panel 530 is in a transmissive state. Also, the processor 100 and the processor 200 mutually collaborate to control the light emission of the backlight in the light source section 300. Here, the image 432 for one screen displayed on the display panel 430 may be, for example, a high-functionality image such as a color image, as shown in FIG. 8(d), or may be a simple image for, for example, hour, minute, and second display of a digital timepiece, as shown in FIG. 9(a). Also, the simple images 434 and 436 in the specific areas displayed on the display panel 430 may be simple segment images or monochrome images displayed in a display area that is sufficiently narrow as compared to the entire display area of the display panel 430, such as time, a measurement value, an icon, or a simple graphic, as shown in FIG. 8(d), FIG. 9(a), and FIG. 9(b).

In the composed image display mode, in the state in which the image 432 for one screen is being displayed in the entire display area of the display panel 430 based on the image data generated by the processor 100, image data is generated by the processor 200 for specific areas of that display area where the images 434 and 436 with a high frequency of update and more changes (motions) are displayed, and is sequentially written in the frame memory 414 of the driver circuit 410 via the interface I/F(C) by specifying an address. This causes the frame memory 414 to be overwritten with the image data at the specified address, and the operation of rewriting the simple images 434 and 436 such as time, a measurement value, or an icon is continuously performed only for the specific areas of the display area of the display panel 430. Here, as for the image data for one screen of the display panel 430 generated by the processor 100 and written in the frame memory 414 of the driver circuit 410, only the image data in the specific areas with which overwriting has been performed by the processor 200 is rewritten, and the image data in areas other than the specific areas are retained as they are. Thus, in areas other than the specific areas of the display area of the display panel 430, the original state in which the image 432 for one screen has been displayed is retained. This operation of rewriting the images in the specific areas continues until an update or change of the images displayed on the display panel 430 occurs in the entire area (or a relatively wide area) of the display area of the display panel 430.

This is specifically described using an image of a timepiece (time) shown in FIG. 9(*a*). Among the image 432 of "hour, minute, second" displayed in a relatively wide area of the display panel 430, as for a display area of "hour, minute" whose display changes every minute, image data generated by the processor 100 is written and retained in the frame memory 414 of the driver circuit 410 with a cycle of one minute, and thus the image of "hour, minute" does not change for fifty-nine seconds. On the other hand, as for a display area of "second" whose display changes every second, image data generated by the processor 200 is written in the frame memory 414 of the driver circuit 410 with a cycle of one second, by which the image (that is, the image in the specific area) 434 of "second" is sequentially rewritten every second as "01"→"02". . . "59" (in the drawing, refer to "specific area rewrite operation").

During the period of this specific area rewrite operation, the processor 100 transmits a collaborative signal to the processor 200 for mutual collaboration, stops generation of image data to be written in the entire area (or a wider area including the above-described specific area) of the display area of the display panel 430, and thereby enters a state of halting the operation of writing in the frame memory 414 of the driver circuit 410. Also, during this operation period, the processor 100 is set in a halt state, and therefore the light emission of the back light in the light source section 300 is controlled by the processor 200. Note that, when only the function of generating and writing image data has been set in a halt state and operations of other functions have been continued in the processor 100, the light emission of the back light in the light source section 300 is controlled by the processor 100.

Also, when an update or change occurs in the image displayed on the display panel 430 in the entire area (or a wider area including the above-described specific area) of the display area of the display panel 430, or more specifically, when the display of "hour, minute" in the image 432 including "hour, minute, second" shown in FIG. 9(*a*) changes, the processor 100 is recovered from the halt state, and image data for one screen of the display panel 430 including "hour, minute, second" is generated by the processor 100. Then, by this image data being written in the frame memory 414 of the driver circuit 410 with a cycle of one minute, the image 432 of the entire area (or a wider area including the above-described specific area) of the display area of the display panel 430 is sequentially rewritten every minute as "12:05:00"→"12:06:00"→. . . (in the drawing, refer to "entire area rewrite operation").

During the period of this entire area rewrite operation, the processor 200 transmits a collaborative signal to the processor 100 to recover from the halt state, stops generation of image data to be written in the specific areas of the display panel 430, and thereby enters a state of temporarily stopping the operation of writing in the frame memory 414 of the driver circuit 410. Here, in the processor 200, only the function associated with the display of the display panel 430 is temporarily stopped, and the operation continues without halting the other functions. Therefore, in this operation period, the light emission of the back light in the light source section 300 can be controlled by the processor 100 or 200. However, since the period is a relatively short time (on the order of one second), the light emission of the back light should preferably be controlled by the processor 200, as with the period of the above-described specific area rewrite operation.

As such, in the composed image display mode, the entire area rewrite operation and the specific area rewrite operation described above are repeatedly performed by being switched at predetermined timing. Thus, as shown in an upper stage of FIG. 8(*d*) and FIG. 9(*a*), a colorful composed image with rich expressive power which has been acquired by the image 432 for one screen displayed on the display panel 430 and the simple images 434 and 436 in the specific areas being combined is visually recognised by the user. In this case, the display function for one display panel 430 by the processors 100 and 200 is operated, and the display function for the other display panel 430 is set in a halt state or a temporary stop state. Thus, the power consumption of the display device 10 is reduced as compared to the case in which a color image or the like and a simple image are displayed and superimposed on the display panels 430 and 530 in the above-described superimposed image display mode.

Also, as shown at Step S156 of the flowchart of FIG. 7, the operation in the composed image display mode described above is continued by the processor 100 or 200 until an event (trigger) of changing the setting of the operation mode is detected. If that event has been detected, the procedure returns to Step S104 to control the display format of the image in the display sections 400 and 500 in accordance with a result of judgment regarding an operation mode newly set. Here, in the composed image display mode as well, the operation of the input operation section 120 by the user is included as an event of changing the setting of the operation mode of the display device 10, as with the color image display mode and the superimposed image display mode described above.

As such, in the present embodiment as well, either one of the display blocks having different processing powers and display performances is used in accordance with the operation mode, and various types of information can be provided in various display formats by using a display block with appropriate processing power and display performance without impairing operability for the user, as with the above-described first embodiment. Here, in the present embodiment in addition to the simple image, the high-functionality image such as a color image, and the superimposed image described above, switching can be performed to a composed image having more reduced power consumption and a display format which is as colorful as that of the superimposed image, in accordance with the operation mode.

In the present embodiment, the control method for the display device has been described by showing, as an example of the screen display, a composed image acquired by the image 432 for one screen and the simple images 434 and 436 in the specific areas being combined or a composed image including so-called hour, minute, and second display of a digital timepiece. However, the present invention is not limited thereto. In another example of the screen display according to the present invention, for example, an image of an analog timepiece constituted by hour, minute, and second hands (Hh, Hm, Hs) may be displayed on the display panel 430, as shown on left and right of FIG. 9(*b*). In this case, as for an image 434 in the specific area indicating the second hand Hs, image data is generated by the processor 200, and the second display of the display panel 430 is rewritten every second (specific area rewrite operation) Also, as for the display of the hour hand Hh and the minute hand Hm, image data is generated by the processor 100, and an image 432 of the entire display area of the display panel 430 is rewritten every minute (entire area rewrite operation). Here, the specific area where the image 434 is updated every second is not an area fixed with respect to the display area of the display panel 430 but a moving or changing area.

Also, as for the size of the specific area, the specific area is not limited to an area that is sufficiently narrow as compared to the entire display area of the display panel 430. The specific area applied in the present invention may have a display area having a size by which, when image data generated by the processor 200 with low processing power is written in the driver circuit 410 via the interface I/F(C) with a low data transfer rate and an image thereof is displayed in the specific area of the display panel 430, the user can favorably visually recognize it without the image being disturbed or interrupted. Accordingly, when the data capacity of image displayed in the specific area is small or when the update or change frequency of the screen display is low, the specific area may be set wider than the display area of the display panel 430.

For example, in the examples of digital timepiece display and analog timepiece display shown in FIG. 9(*a*) and FIG. 9(*b*) the case has been described in which the image 434 in the specific area is rewritten by the processor 200 having low processing power with only second display and the display of the second hand as being in a specific area. However, the present invention is not limited thereto. That is, by slightly shifting rewrite timing by the processor 200 with low processing power, the image of hour and minute display may be rewritten by the processor 200 with low processing power during intervals between operations of rewriting the image of second display every second. Accordingly, the processor 100 with high processing power can be set in a halt state for a longer time (for example, during a period in which timepiece display continues on the display panel 430), and the power consumption of the display device 10 can be significantly reduced.

Next, modification examples in each of the above-described embodiments are described.

First Modification Example

FIG. 10 is a schematic block diagram showing modification examples of each of the above-described embodiments.

In each of the above-described embodiments, the case has been described in which, as for the light source section 300 such as the back light arranged on the back surface side of the display panel 430, the processors 100 and 200 mutually collaborate in accordance with the operation mode of the display device 10 and light emission is controlled by one of the processors 100 and 200. However, the present invention is not limited thereto. That is, light emission may be constantly controlled by the processor 200 with low processing power, as shown in FIG. 10(*a*) and FIG. 10(*b*). As a result, the processing load on the processor 100 can be reduced, and power consumption in a halt state can be further reduced.

Second Modification Example

A normal information processing device such as a display device is operated under an OS (such as WINDOWS (registered trademark) of Microsoft Corporation in the United States or ANDROID (registered trademark) of Google Inc. in the United States) and is, in general, stopped when the OS is shut down. However, in the display device of the present embodiment, even if the OS is shut down, the BIOS, which is a relatively small program, continues operation, so that an image can be displayed on the display panel 530. This operation state corresponds to the second operation mode according to the present invention. In general, a display device for full-color display such as a smartphone consumes high power, and therefore is required to be charged every day. However, image display on the display panel 530 to which a PN-type liquid-crystal panel or the like has been applied does not consume high power. Accordingly, the display device can be used for several weeks if it is used only for timepiece display by a reflective type. Thus, the display device 10 can be used as a timepiece in a state of being shut down. In addition, when illumination is required in this state, for example, by the user pressing a button switch of the input operation section 220, the BIOS can detect that input, and the processor 200 can control the light source section 300 for illumination. This operation state corresponds to the third operation mode in the present invention (see FIG. 3(*a*-2) and FIG. 8(*a*-2), for example).

Third Modification Example

Also, in each of the above-described embodiments, the case has been described in which the operation modes of the display device 10 include the simple image display mode, the color image display mode, the superimposed image display mode, and the display halt mode. In addition, the case has been described in which the composed image display mode is added. However, the present invention is not limited thereto. For example, the operation modes may include only the simple image display mode and the color image display mode or may include only the simple image display mode, the color image display mode, and the display halt mode. In that case, it is not required to simultaneously display images on two overlapping display panels 430 and 530 as in the superimposed image display mode. Therefore, one of the processors 100 and 200 can substantially enter a halt state or power-saving state, and the power consumption of the display device 10 can be reduced.

Fourth Modification Example

Also, in each of the above-described embodiments, the structure has been described in which the first display block. BL1 includes the processor 100 with high processing power, the interface with a high transfer speed, and the display section 400 with high display performance and the second display block BL2 includes the processor 200 with relatively low processing power, the interface with a low transfer speed, and the display section 500 with low display performance. However, the present invention is not limited thereto. For example, the first display block BL1 and the second display block BL2 may have structures where their processors, interfaces, and display sections have the same performance. In this case, in the first display block BL1, the processor 100 is operated at a high operation frequency, and image data with a large data capacity is generated, transferred to the display section 400 at a high transfer speed, and displayed on the display panel 430 as a high-functionality image. On the other hand, in the second display block BL2, the processor 200 is operated at a low operation frequency, and image data with a small data capacity is generated, transferred to the display section 500 at a low transfer speed, and displayed on the display panel 530 as a simple image. In this structure and the control method as well, either one of the first display block BL1 and the second display block BL2 is used in accordance with the operation mode, as with each of the above-described embodiments. Thus, various types of information can be provided in various display formats without impairing operability for the user, and the power consumption of the display device 10 can be reduced.

Although the embodiments of the present invention have been described above, the present invention is not limited thereto and includes the invention described in the scope of claims and its equivalent scope.

Description of Reference Numerals 10 display device
100, 200 processor
120, 220 input operation section
140, 240 memory section
150, 250 collaborative communication section
210 sensor section
300 light source section
400, 500 display section
410, 510 driver circuit
412, 512 interface circuit
414 frame memory
430, 530 display panel
514 image memory
600 power supply section
BL1 first display block
BL2 second display block
I/F(A)-I/F(C) interface

The invention claimed is:

1. A display device having a first display panel and a second display panel, the first display panel laminated thereon from a visual field side, and comprising a control section and a light source section,
wherein:
the control section includes a first processor which operates at a first operation frequency and generates first image data and a second processor which operates at a second operation frequency lower than the first operation frequency and generates second image data, the first processor and the second processor performing control operations in collaboration with each other by transmitting and receiving predetermined collaborative signals via collaborative communication sections,
the control section performs switching of operation modes including:
a first operation mode where a first image based on the first image data is displayed on the first display panel by the first processor, and a function of displaying a second image based on the second image data on the second display panel is set to enter a transmissive state by the first processor or the second processor; and
a second operation mode where at least a function of displaying the first image on the first display panel is set to enter a sleep state or a power supply OFF state, and the second image is displayed on the second display panel by the second processor, and
the first processor is operated by an "Operating System" (OS), and the second processor is operated by a "Basic Input Output System" (BIOS).

2. The display device according to claim 1, wherein, in a normal state, the first processor operates a first display block including the first processor and the first display panel by the OS and, when the OS is shut down, the second processor activates a second display block including the second processor and the second display panel by the BIOS so as to cause the second display panel to display in the second operation mode.

3. The display device according to claim 2, wherein a third operation mode is included in which, when the second display panel is displaying by the BIOS, lighting of the light source section is controlled by the second processor with a predetermined operation of the user, whereby the second image data is displayed.

4. The display device according to claim 1, wherein the operation modes further include a fifth operation mode where at least the function of displaying the first image on the first display panel is set to enter the sleep state or the power supply OFF state, and the function of displaying the second image on the second display panel is set to enter the sleep state or the power supply OFF state, and
wherein the control section controls a light-emitting status of the light source section by the first processor or the second processor at least in a state in which the first image is being displayed on the first display panel, and controls the light-emitting status of the light source section by the second processor in a state in which the second image is being displayed only on the second display panel.

5. The display device according to claim 4, wherein the operation modes further include a sixth operation mode where a third image acquired by the first image and the second image being superimposed is displayed by the first processor displaying the first image on the first display panel and the second processor displaying the second image on the second display panel.

6. The display device according to claim 4, wherein the operation modes further include a fourth operation mode where a fourth image acquired by the first image and the second image being combined is displayed by the first processor displaying the first image on the first display panel and displaying the second image in a specific area of the first display panel.

7. The display device according to claim 4, wherein the control section performs switching of at least the first operation mode, the second operation mode, and the fifth operation mode, in accordance with display statuses of the first image and the second image.

8. The display device according to claim 4, further comprising an input operation detection section which detects a signal associated with an input operation of a user,
wherein the control section performs switching of at least the first operation mode, the second operation mode, and the fifth operation mode, in accordance with the input operation of the user detected by the input operation detection section.

9. The display device according to claim 8, wherein the control section switches to the first operation mode where the first image is displayed on the first display panel when the input operation by the user is detected, and switches to, when the input operation by the user is no longer detected, the second operation mode where the second image is displayed only on the second display panel after a predetermined time elapses.

10. The display device according to claim 4, further comprising a remaining battery level detection section which detects a remaining battery amount,
wherein the control section performs switching of at least the first operation mode, the second operation mode, and the fifth operation mode in accordance with the battery remaining amount detected by the remaining battery level detection section.

11. The display device according to claim 4, wherein in the fifth operation mode, functions of the control section other than the functions of displaying the first and second images on the first and second display panels are continued.

12. The display device according to claim 1, wherein the first display panel is a high definition display panel and consumes high power, and the second display panel is a low definition display panel and consumes low power as compared to the first display panel.

* * * * *